United States Patent
Lysien et al.

(10) Patent No.: US 11,987,049 B2
(45) Date of Patent: May 21, 2024

(54) METHOD OF FORMING A FEATURE BY DISPENSING A METALLIC NANOPARTICLE COMPOSITION FROM AN INK-JET PRINT HEAD AND A METALLIC NANOPARTICLE COMPOSITION FOR INK-JET PRINTING

(71) Applicant: XTPL S.A., Wrocław (PL)

(72) Inventors: Mateusz Lysien, Żywiec (PL); Ludovic Schneider, Wrocław (PL); Grzegorz Tarapata, Czersk (PL); Filip Granek, Mrozów (PL)

(73) Assignee: XTPL S.A., Wrocław (PL)

( * ) Notice: Subject to any disclaimer, the term of this patent is extended or adjusted under 35 U.S.C. 154(b) by 0 days.

(21) Appl. No.: 18/247,536

(22) PCT Filed: Feb. 11, 2022

(86) PCT No.: PCT/IB2022/051232
§ 371 (c)(1),
(2) Date: Mar. 31, 2023

(87) PCT Pub. No.: WO2022/172210
PCT Pub. Date: Aug. 18, 2022

(65) Prior Publication Data
US 2023/0373209 A1 Nov. 23, 2023

Related U.S. Application Data

(60) Provisional application No. 63/148,701, filed on Feb. 12, 2021.

(51) Int. Cl.
*B41J 2/045* (2006.01)
*C09D 11/033* (2014.01)
(Continued)

(52) U.S. Cl.
CPC ....... *B41J 2/04588* (2013.01); *B41J 2/04581* (2013.01); *C09D 11/033* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| | | | |
|---|---|---|---|
| 2002/0167559 A1 | 11/2002 | Hosono et al. | |
| 2005/0189520 A1* | 9/2005 | Okada | H01B 1/22 252/500 |

(Continued)

FOREIGN PATENT DOCUMENTS

| | | |
|---|---|---|
| JP | 2016034720 A | 3/2016 |
| WO | 2022172210 A2 | 8/2022 |

OTHER PUBLICATIONS

International Search Report and Written Opinion for corresponding International PCT Application No. PCT/IB2022/051232, dated Aug. 8, 2022.

*Primary Examiner* — Manish S Shah
(74) *Attorney, Agent, or Firm* — K&L Gates LLP

(57) ABSTRACT

A method of forming a feature by dispensing a metallic nanoparticle composition from an ink-jet print head is disclosed. A jetting waveform is applied to piezoelectric actuator to dispense droplets of the metallic nanoparticle composition through nozzle opening. The droplets range in volume between 0.5 picoliter and 2.0 picoliter. The jetting waveform includes an intermediate contraction waveform portion, a final contraction waveform portion after the intermediate contraction waveform portion, and an expansion waveform portion after the final contraction waveform portion. During the intermediate contraction waveform por-
(Continued)

tion, an applied voltage increases from an initial low voltage to an intermediate voltage and then is held at the intermediate voltage. During the final contraction waveform portion, the applied voltage increases from the intermediate voltage to maximum voltage and then is held at the maximum voltage. During the expansion waveform portion, the applied voltage decreases from the maximum voltage to a final low voltage.

38 Claims, 16 Drawing Sheets

(51) Int. Cl.
| | |
|---|---|
| C09D 11/037 | (2014.01) |
| C09D 11/106 | (2014.01) |
| C09D 11/322 | (2014.01) |
| C09D 11/36 | (2014.01) |
| C09D 11/52 | (2014.01) |

(52) U.S. Cl.
CPC .......... *C09D 11/037* (2013.01); *C09D 11/106* (2013.01); *C09D 11/322* (2013.01); *C09D 11/36* (2013.01); *C09D 11/52* (2013.01); *B41J 2202/03* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 7/61; C09D 7/62; C09D 7/68; C09D 7/70; C09D 11/00; C09D 11/037; C09D 11/326; B41M 5/0011; B41M 5/0017; B41M 5/0023; B41M 5/0047; B41M 7/00; B41M 7/0072; B41M 5/52; B41M 5/5218; B41M 5/5227; C09K 11/02; C09K 11/883; H01L 33/06; H01L 2933/0091; C08K 3/22; C08K 7/18; C08K 9/00; Y10T 29/49401

See application file for complete search history.

(56) References Cited

U.S. PATENT DOCUMENTS

| | | | |
|---|---|---|---|
| 2007/0002091 A1* | 1/2007 | Kida | B41J 2/04581 347/19 |
| 2008/0308001 A1 | 12/2008 | Okada et al. | |
| 2012/0105559 A1 | 3/2012 | Berube et al. | |
| 2014/0035995 A1* | 2/2014 | Chou | C09D 11/322 252/514 |
| 2014/0085365 A1* | 3/2014 | Kasahara | B41J 2/04581 347/10 |
| 2020/0276808 A1 | 9/2020 | To | |

* cited by examiner

METHOD OF FORMING A FEATURE BY DISPENSING A METALLIC NANOPARTICLE COMPOSITION FROM AN INK-JET PRINT HEAD AND A METALLIC NANOPARTICLE COMPOSITION FOR INK-JET PRINTING

CROSS-REFERENCE TO RELATED APPLICATIONS

This application is a U.S. national stage application, filed under 35 U.S.C. § 371, of International Application No. PCT/IB2022/051232, which was filed on Feb. 11, 2022, and which claims priority to U.S. provisional Patent Application No. 63/148,701, which was filed on Feb. 12, 2021. The contents of each are hereby incorporated by reference into this specification.

BACKGROUND

Industrial ink-jet printers are available for printing a wide variety of materials. With recent advances in nanoparticle technology, metallic nanoparticles of predetermined characteristics can be made. For novel electronics applications, a capability to print metallic nanoparticle features characterized by line widths of <100 μm and <50 μm would be desirable. In order to enable such smaller features by ink-jet printing, metallic nanoparticle composition that are compatible with picoliter ink-jet print heads and methods of dispensing metallic nanoparticle compositions from such print heads are needed.

SUMMARY OF THE INVENTION

In one aspect, a method of forming a feature by dispensing a metallic nanoparticle composition from an ink-jet print head includes: configuring the ink-jet print head and applying a jetting waveform to the piezoelectric actuator to dispense droplets of the metallic nanoparticle composition through the nozzle opening. The droplets range in volume between 0.5 picoliter and 2.0 picoliter. The jetting waveform includes an intermediate contraction waveform portion, a final contraction waveform portion after the intermediate contraction waveform portion, and an expansion waveform portion after the final contraction waveform portion. During the intermediate contraction waveform portion, an applied voltage increases from an initial low voltage to an intermediate voltage and then is held at the intermediate voltage. During the final contraction waveform portion, the applied voltage increases from the intermediate voltage to a maximum voltage and then is held at the maximum voltage. During the expansion waveform portion, the applied voltage decreases from the maximum voltage to a final low voltage.

In another aspect, a metallic nanoparticle composition for ink-jet printing includes silver nanoparticles and a glycol ether solvent. The glycol ether solvent has a boiling point in a range of 200° C. to 240° C., a viscosity in a range of 4 cP and 8 cP at 25° C., and a vapor pressure not exceeding 0.1 mm Hg at 25° C. A concentration of silver in the metallic nanoparticle composition is in a range of 20 wt % to 40 wt %. Polyvinylpyrrolidone (PVP) is present on the silver nanoparticle surfaces.

The above summary of the present invention is not intended to describe each disclosed embodiment or every implementation of the present invention. The description that follows more particularly exemplifies illustrative embodiments. In several places throughout the application, guidance is provided through examples, which examples can be used in various combinations. In each instance of a list, the recited list serves only as a representative group and should not be interpreted as an exclusive list.

BRIEF DESCRIPTION OF THE FIGURES

The disclosure may be more completely understood in consideration of the following detailed description of various embodiments of the disclosure of the disclosure in connection with the accompanying drawings, in which.

DETAILED DESCRIPTION OF ILLUSTRATIVE EMBODIMENTS

The present disclosure relates to method of forming a feature by dispensing a metallic nanoparticle composition from an ink-jet print head and a metallic nanoparticle composition for ink-jet printing.
In this disclosure:

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The terms "comprises" and variations thereof do not have a limiting meaning where these terms appear in the description and claims.

Unless otherwise specified, "a," "an," "the," and "at least one" are used interchangeably and mean one or more than one.

The recitations of numerical ranges by endpoints include all numbers subsumed within that range (e.g., 1 to 5 includes 1, 1.5, 2, 2.75, 3, 3.80, 4, 5, etc.).

For any method disclosed herein that includes discrete steps, the steps may be conducted in any feasible order. As appropriate, any combination of two or more steps may be conducted simultaneously.

For experiments described herein, we have used a Fujifilm Dimatix ink-jet printer to dispense the metallic nanoparticle compositions. Although there is strong interest in using ink-jet printing to dispense relatively narrow nanoparticle features, such as lines having line widths of <100 µm or <50 µm, it has proven quite difficult to make a suitable nanoparticle composition. There is a tendency for the nanoparticles to aggregate in the print head, which leads of clogging of the nozzle. In order to decrease the likelihood of nanoparticle aggregation, a nozzle (nozzle opening) that generates droplets that are larger than desired are typically used. In the example printer, a print head rated for dispensing 10 picoliter (pl) droplets is typically used in the case of conventional nanoparticle compositions. However, the metallic nanoparticle compositions (silver nanoparticle compositions) and printing methods described herein enable the use of 1 pl print heads without any clogging for several weeks of use.

Figure 1:
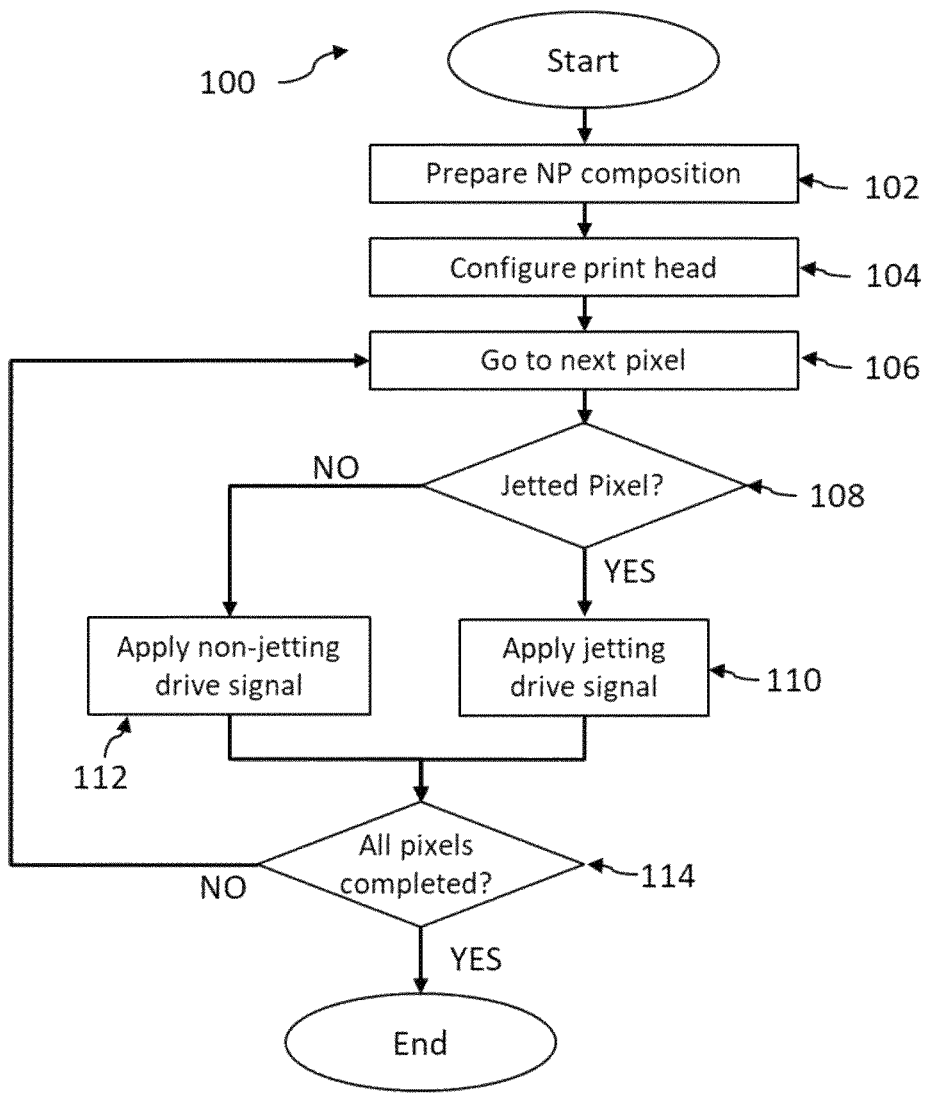
FIG. 1 is a flow diagram of a method of forming a feature by ink-jet printing.

FIG. 1 is a flow diagram of a method 100 of forming a feature by ink-jet printing. Method 100 includes steps 102, 104, 106, 108, 110, 112, and 114. At step 102, a metallic nanoparticle composition is prepared. Step 102 includes the synthesis of the silver nanoparticles if they are not already available. The synthesis of suitable silver nanoparticles is illustrated in Example 1 and Example 2 hereinbelow. Example 2 is identical to Example 1 with respect to the synthesis of silver nanoparticles. Generally, the synthesis of metallic nanoparticles in solution employs three components: (1) metal precursors (e.g., $AgNO_3$ for silver nanoparticles); (2) reducing agents (e.g., ethylene glycol for silver nanoparticles); and (3) stabilizing (capping) agents (e.g., polyvinylpyrrolidone). Polyvinylpyrrolidone, abbreviated as PVP, is soluble in water and other polar solvents. When PVP is effectively used as a dispersant, stable colloidal silver nanoparticles covered (capped) with PVP polymer can be obtained in small size (<250 nm) because the PVP reduces the aggregation of the silver.

The average size of the silver nanoparticles can be controlled to within a range of 20 nm to 80 nm. The average particle size and dispersity can be controlled by controlling thermodynamic and kinetic reaction parameters. Reaction temperature, temperature ramp, and reaction time are the important thermodynamic reaction parameters. The rate of addition of reagents and molar ratio of used metal precursor to stabilizing agent (PVP) are the important kinetic reaction parameters. An appropriate combination of these parameters leads to obtaining nanoparticles that exhibit the desired properties of small particles size, low dispersity, and high dispersion stability (low occurrence of aggregation).

Step 102 includes making a metallic nanoparticle composition from the metallic nanoparticles (silver nanoparticles). Generally, the nanoparticles are separated, to remove impurities and excess PVP, and dispersed in a solvent or a solvent mixture. The metallic nanoparticle composition may optionally include additives to better control its physicochemical properties. These additives include surfactants, binders, adhesion promoters, and antifoaming agents.

The preparation of suitable metallic nanoparticle compositions is illustrated in Example 1 and Example 2 hereinbelow. Generally, the composition includes a glycol ether solvent having a boiling point in a range of 200° C. to 240° C., a viscosity in a range of 4 cP and 8 cP at 25° C., and a vapor pressure not exceeding 0.1 mm Hg at 25° C. Preferably, the glycol ether solvent is 2-(2-butoxyethoxy)ethanol. An alternative name for 2-(2-butoxyethoxy)ethanol is diethylene glycol monobutyl ether. The 2-(2-butoxyethoxy)ethanol solvent has a boiling point of 230° C. at 760 mm Hg, a viscosity of 6.0 cP at 25° C., a surface tension of 30.0 mN/m measured at 25° C., and a vapor pressure of 0.03 mm Hg at 25° C. Preferably, a concentration, in aggregate, of water, methanol, ethanol, 1-propanol, and 2-propanol, in the metallic nanoparticle composition does not exceed 10.0 wt %. Preferably, a concentration, in aggregate, of solvents other than the glycol ether solvent in the metallic nanoparticle composition does not exceed 10.0 wt %. A concentration of silver in the metallic nanoparticle composition is in a range of 20 wt % to 40 wt %. Preferably, the concentration of silver in the metallic nanoparticle composition is in a range of 32 wt % to 39 wt %. Polyvinylpyrrolidone (PVP) is present on the silver nanoparticle surfaces. In the Example 1 composition, the concentration of silver is estimated to be in a range of 32 wt % to 34 wt %. The solids concentration is estimated to be higher, in a range of 34 wt % to 36 wt %, because of the presence of solids other than silver in the composition, such as PVP. In the Example 2 composition, the concentration of silver is estimated to be in a range of 37 wt % to 39 wt %. Both Example 1 and Example 2 compositions have been used successfully in the printing experiments described herein.

Figures 22, 23:
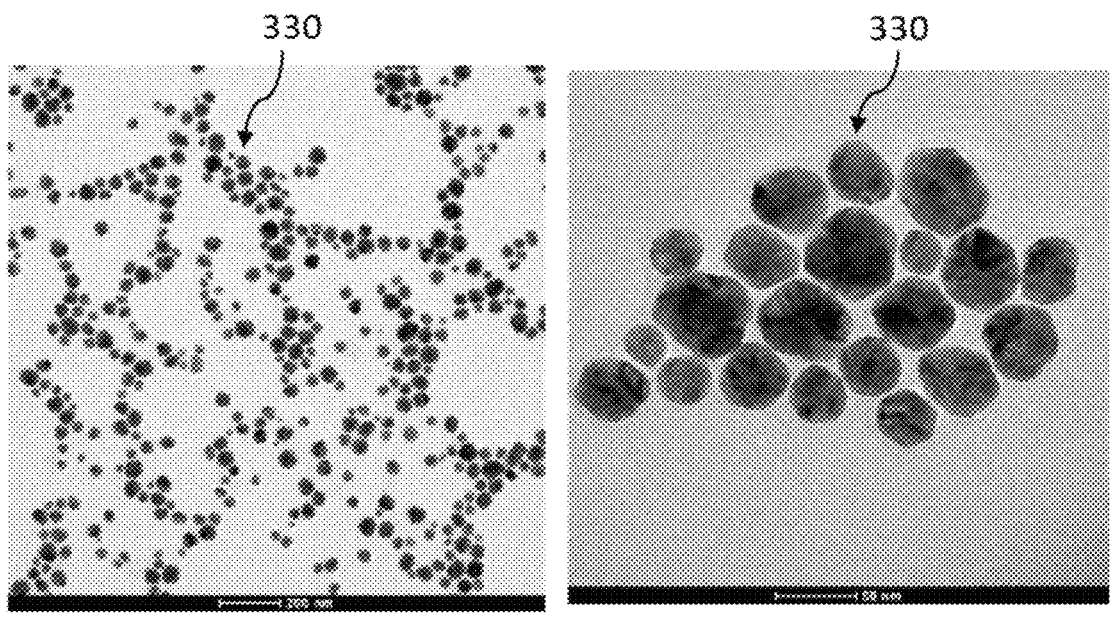
FIG. 22 is a transmission electron microscopy (TEM) image of silver nanoparticles under lower magnification.
FIG. 23 is a transmission electron microscopy (TEM) image of silver nanoparticles under higher magnification.

Preferably, the silver nanoparticles have an average particle size in a range of 20 nm to 80 nm. Preferably, the silver nanoparticles have an average particle size in a range of 35 nm to 50 nm. Preferably, the silver nanoparticles are approximately spherical. FIG. 22 is a transmission electron microscopy (TEM) image of silver nanoparticles 330 synthesized according to Example 1, under lower magnification. FIG. 23 is a TEM image of the same silver nanoparticles under higher magnification. It can be seen that the silver nanoparticles are approximately spherical.

The Example 1 silver nanoparticle composition was measured to have a viscosity in a range of a range of 26 cP to 30 cP, measured at 25° C. under a shear rate of 100 $s^{-1}$. The Example 2 silver nanoparticle composition was measured to have a viscosity in a range of a range of 50 cP to 60 cP, measured at 25° C. under a shear rate of 100 $s^{-1}$. Preferably, the silver nanoparticle composition has a viscosity in a range of 26 cP to 60 cP, measured at 25° C. under a shear rate of 100 $s^{-1}$. Preferably, a surface tension of the silver nanoparticle composition is in a range of 28 mN/m to 32 mN/m, measured at 25° C.

Step 102 (FIG. 1) preferably includes some additional processing before the silver nanoparticle composition is poured (injected) into the print head. Such additional processing includes: (1) mixing of a vial of the silver nanoparticle composition in an ultrasonic water bath for 10 minutes; (2) degassing of the silver nanoparticle composition in a vacuum desiccator for 15 minutes; and (3) filtering the silver nanoparticle composition through a 1 µm polyamide filter.

Figures 2, 3:
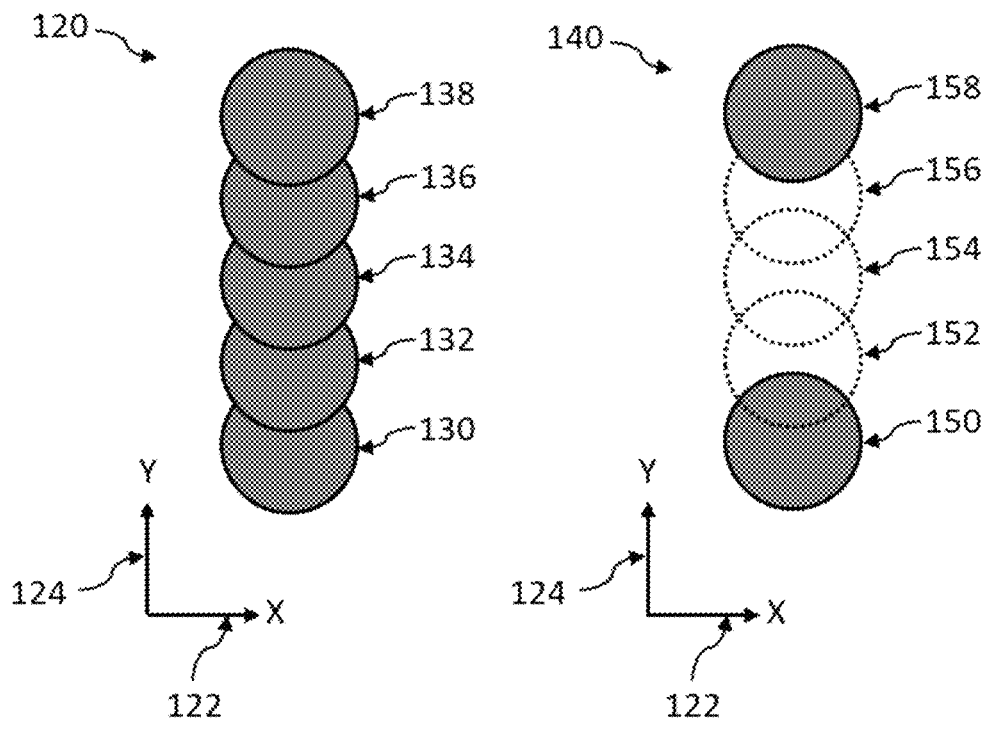
FIG. 2 is a schematic top view of jetted pixels.
FIG. 3 is a schematic top view of jetted and non-jetted pixels.
Figure 17:
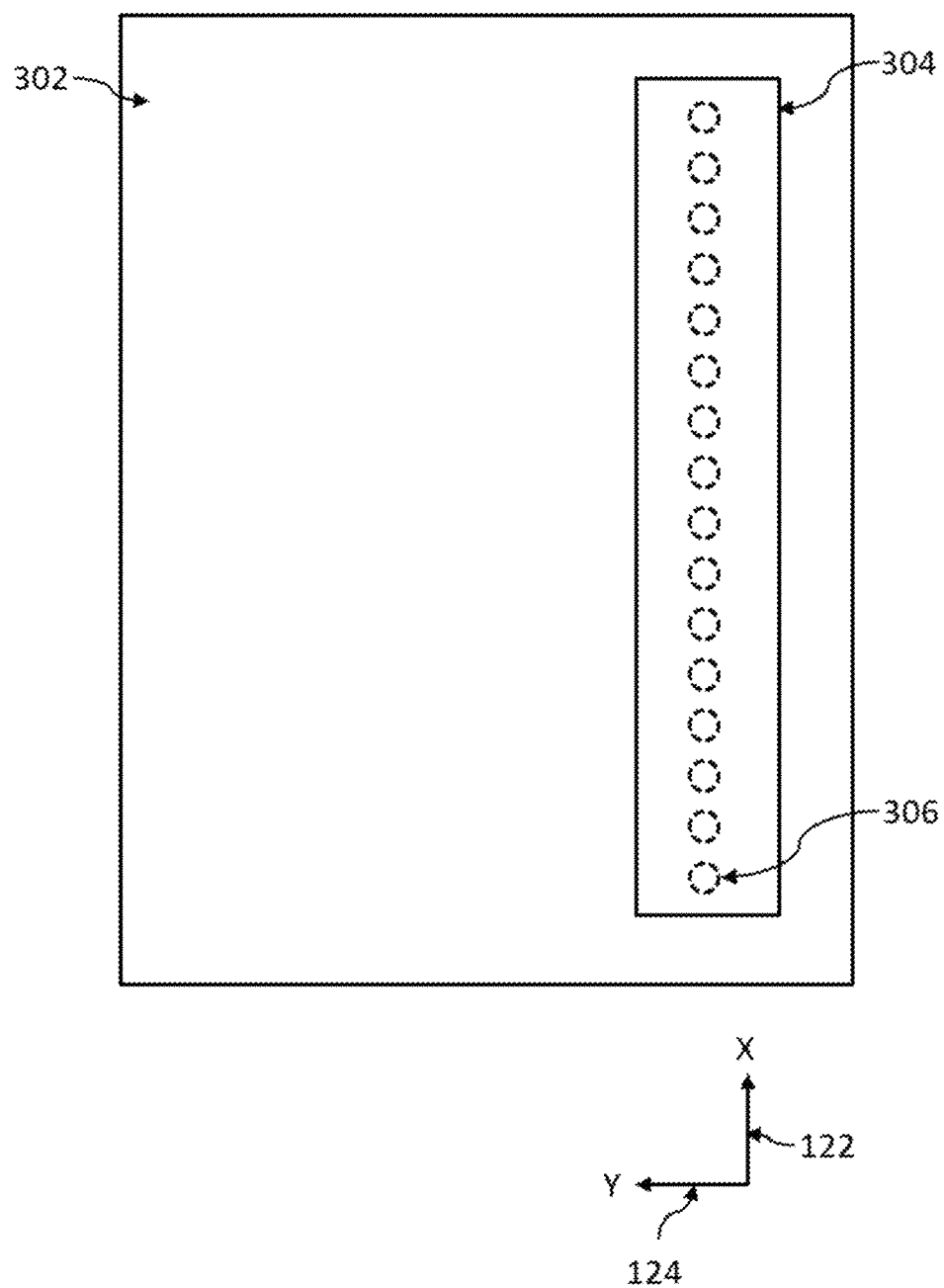
FIG. 17 is a schematic top view of an implementation of an ink-jet printer.

At step 104 (FIG. 1), the ink-jet print head is configured. This step 104 includes filling (injecting) the silver nanoparticle composition into the print head and installing the print head in the ink-jet printer. FIG. 17 is a schematic top view of an ink-jet printer implementation, with a print head 304 suspended above a substrate 302. The print head 304 includes nozzles 306. Typical vertical distances between the nozzle opening (318, FIG. 18) of the print head 304 and the substrate 302 are in a range of 500 µm to 750 µm. In the example shown, there are 16 nozzles (drawn as dotted circles) arranged in a one-dimensional array extending along the X-axis direction 122. During the printing, the print head 304 is laterally displaced along the Y-axis direction 124 relative to the substrate 302. The X-axis direction 122 and Y-axis direction 124 are perpendicular to each other and are perpendicular to a vertical direction (Z-axis direction). Each of the nozzles 306 prints pixels as the print head 304 is laterally displaced along the Y-axis direction. FIG. 2 shows an example in which nozzle 306 has formed jetted pixels 130, 132, 134, 136, and 138 (collectively referred to as pixels 120). In the example shown, adjacent pixels overlap. FIG. 3 shows another example in which nozzle 306 has formed jetted pixels 150 and 158. The jetted pixels 150 and 158 are separated by non-jetted pixels 152, 154, and 156. The jetted pixels (150, 158) and non-jetted pixels (152, 154, 156) are collectively referred to as pixels 140.

Printing operations of the ink-jet printer are carried out starting at step 106 (FIG. 1). At step 106, the print head positioning system displaces the print head to the location of the next pixel (e.g., pixel 150 of FIG. 3). At decision step 108, one of the following is selected: (a) the pixel is a jetted pixel ("YES" branch at decision step 108); and (b) the pixel is a non-jetted pixel ("NO" branch at decision step 108). A pixel that is to be jetted is referred to as a jetted pixel although jetting has not yet occurred. A pixel that is not to be jetted is referred to as a non-jetted pixel. If the pixel is a jetted pixel, a jetting drive signal is applied to the piezoelectric actuator of the print head (step 110). Upon application of the jetting drive signal, a droplet of ink is dispensed through the nozzle opening. In this case, the ink is the silver nanoparticle composition. In the examples shown, the droplets range in volume between 0.5 picoliter and 2.0 picoliter. If the pixel is a non-jetted pixel, a non-jetting drive signal is applied to the piezoelectric actuator of the print head (step 112). Upon application of the non-jetting drive signal, no ink is dispensed through the nozzle opening. At decision step 114, one of the following is selected: (a) the printing of all pixels is complete ("YES" branch at decision step 114); and (b) the printing of all pixels is not yet complete ("NO" branch at decision step 114). If the printing of all pixels is complete ("YES" branch at decision step 114), the printing operations can end. If the printing of all pixels is not yet complete ("NO" branch at decision step 114), the print head positioning system displaces the print head to the location of the next pixel (e.g., pixel 152 of FIG. 3). Steps 106, 108, 110, 112, and 114 are repeated until the printing of all pixels is complete.

Figure 24:
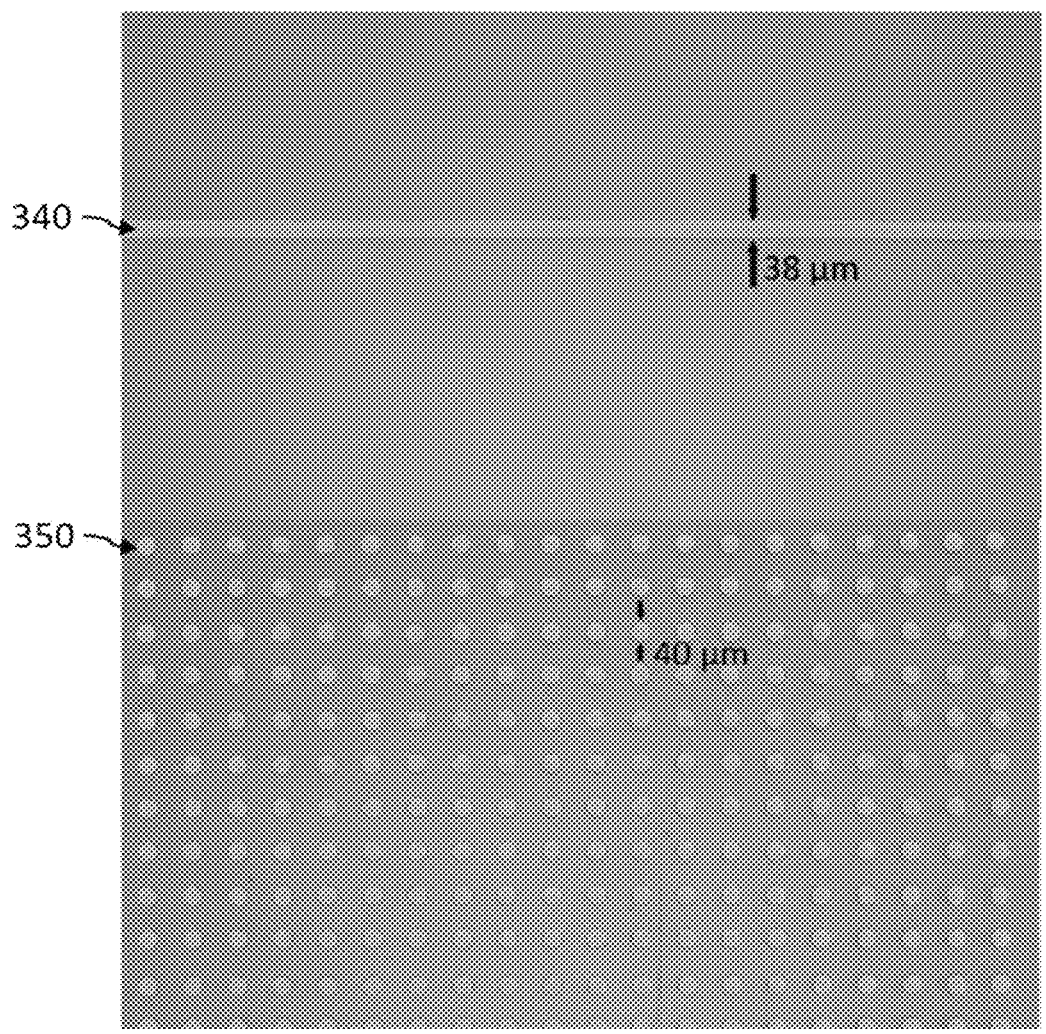
FIG. 24 is an optical microscope image of features, including a line and dots, formed according to the present invention.

Examples of features that are formed by method 100 on a glass substrate are shown in FIG. 24. Printed features include a line 340 and dots (circles) 350. For lines, line widths of less than or equal to 40 μm are possible. For dots, dot diameters of less than or equal to 40 μm are possible. The composition can be dispensed on substrates including polyimide, polyethylene terephthalate (PET), and glass. An example of polyimide film is Kapton 500HN. Typically, resulting features have electrical resistivity of approximately $3.95 \times 10^{-8}$ Ωm, which is approximately 41% of bulk silver conductivity. After dispensing, the work piece can optionally be sintered. Preferred sintering conditions are 250° C., for 40 minutes in air or nitrogen atmosphere.

Figure 4:
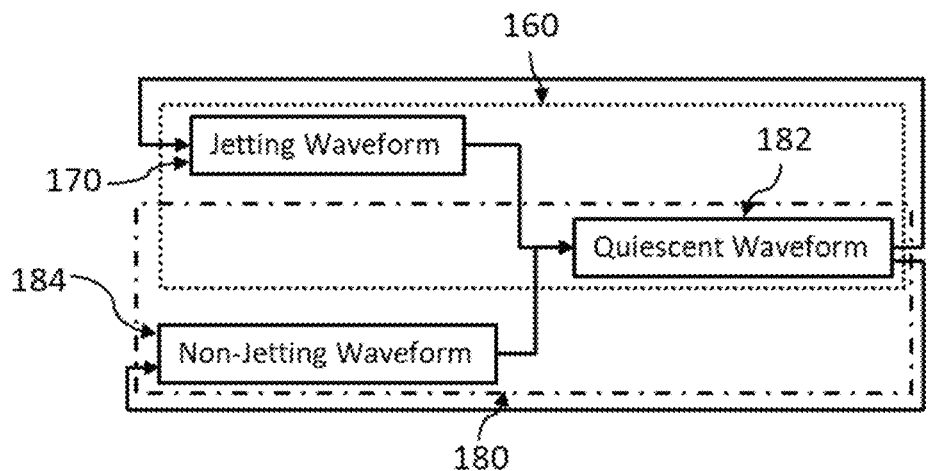
FIG. 4 is a schematic diagram illustrating relationships among jetting, non-jetting, and quiescent waveforms.

During printing, a jetting drive signal and a non-jetting drive signal are used. A typical relationship among waveforms is schematically illustrated in FIG. 4. When the nozzle opening is at a jetted pixel (e.g., 150, 158), a jetting drive signal 160 is applied to the piezoelectric actuator. When the nozzle opening is at a non-jetted pixel (e.g., 152, 154, 156), a non-jetting drive signal 180 is applied to the piezoelectric actuator. The jetting drive signal 160 includes a jetting waveform 170 and a quiescent waveform 182 after the jetting waveform 170. The non-jetting drive signal 180 includes a non-jetting waveform 184 and the quiescent waveform 182 after the non-jetting waveform 170. For example, if there is a jetted pixel and non-jetted pixel immediately after the jetted pixel, the sequence of waveforms is as follows: jetting waveform 170, quiescent waveform 182, non jetting waveform 184, and quiescent waveform 182. Consider an example of a maximum jetting frequency of 5 kHz, which means that for each nozzle opening, a jetted pixel is formed at a rate of 5 kHz or less, or one jetted pixel is formed every 200 μs or greater. For example, if a duration of the jetting waveform is approximately 10 μs, then a duration of the quiescent waveform would be 190 μs or greater.

Figure 5:
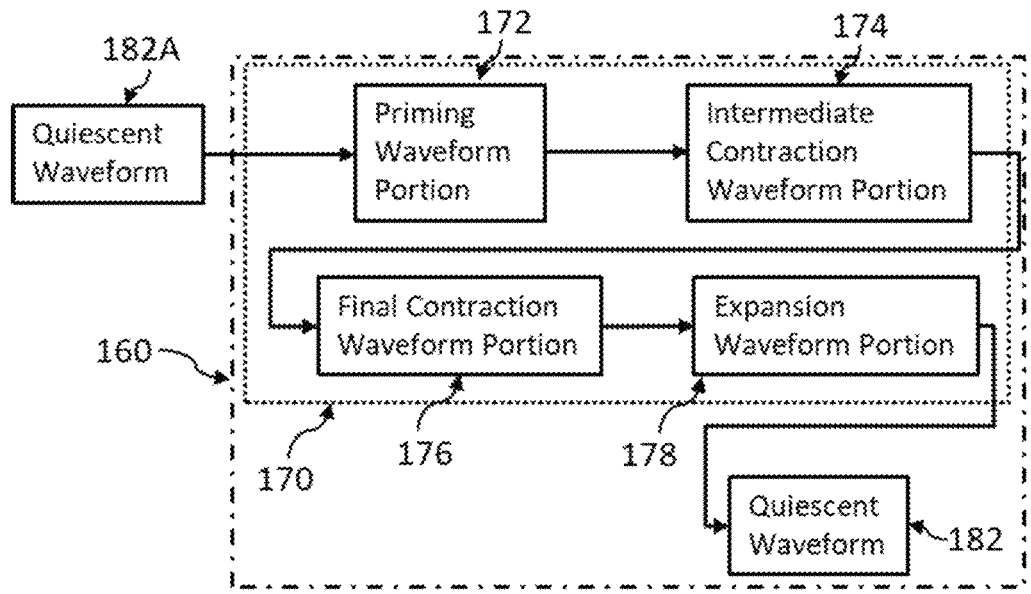
FIG. 5 is a schematic diagram illustrating components of a jetting drive signal.

FIG. 5 is a schematic diagram illustrating certain components of a jetting drive signal. The jetting drive signal 160 is applied after the quiescent waveform 182A of a previous pixel. The jetting drive signal includes a jetting waveform 170 and a quiescent waveform 182 after the jetting waveform 170. The jetting waveform 170 includes: an intermediate contraction waveform portion 174, a final contraction waveform portion 176 after the intermediate contraction waveform portion 174, and an expansion waveform portion 178 after the final contraction waveform portion 176. Optionally, the jetting waveform 170 also includes a priming waveform portion 172 before the intermediate contraction waveform portion 174.

FIGS. 8, 9, 10, 11, 12, 13, 14, 15, and 16 are graphical plots of respective implementations of drive signals. Each of these figures (FIGS. 8, 9, 10, 11, 12, 13, 14, 15, and 16) shows a respective drive signal implementation (210, 220, 230, 240, 250, 260, 270, 280, 290) including a respective jetting waveform (212, 222, 232, 242, 252, 262, 272, 282, 292) and a respective non-jetting waveform (214, 224, 234, 244, 254, 264, 274, 284, 294).

TABLE 1

Characteristics of Jetting Waveforms

| FIG. No. | Drive Signal | Jetting waveform | | Time Zero | Portion 1 | Portion 2 | Portion 3 | Portion 4 |
|---|---|---|---|---|---|---|---|---|
| 8 | 210 | 212 | Voltage level % | 27 | 7 | 73 | 0 | 27 |
| | | | Slew rate | | 1.00 | 1.00 | 2.00 | 1.00 |
| | | | Duration us | | 2.56 | 2.56 | 3.84 | 2.56 |
| | | | Waveform Portions | | Priming | Intermediate | Other | Other |
| 9 | 220 | 222 | Voltage level % | 27 | 7 | 73 | 100 | 27 |
| | | | Slew rate | | 1.00 | 1.00 | 2.00 | 1.00 |
| | | | Duration us | | 2.56 | 2.048 | 2.56 | 2.56 |
| | | | Waveform Portions | | Priming | Intermediate | Final. | Expansion |
| 10 | 230 | 232 | Voltage level % | 27 | 7 | 73 | 100 | 27 |
| | | | Slew rate | | 1.00 | 0.98 | 0.18 | 1.00 |
| | | | Duration us | | 2.56 | 0.64 | 2.56 | 2.56 |
| | | | Waveform Portions | | Priming | Other | Final. | Expansion |
| 11 | 240 | 242 | Voltage level % | 27 | 7 | 73 | 100 | 27 |

TABLE 1-continued

Characteristics of Jetting Waveforms

| FIG. No. | Drive Signal | Jetting waveform | | Time Zero | Portion 1 | Portion 2 | Portion 3 | Portion 4 |
|---|---|---|---|---|---|---|---|---|
| | | | Slew rate | | 1.00 | 0.31 | 1.70 | 1.00 |
| | | | Duration us | | 2.56 | 2.48 | 2.56 | 2.56 |
| | | | Waveform Portions | | Priming | Other | Final | Expansion |
| 12 | 250 | 252 | Voltage level % | 27 | 7 | 73 | 100 | 27 |
| | | | Slew rate | | 1.00 | 0.98 | 0.36 | 1.00 |
| | | | Duration us | | 2.56 | 0.64 | 2.368 | 2.56 |
| | | | Waveform Portions | | Priming | Other | Final | Expansion |
| 13 | 260 | 262 | Voltage level % | 27 | 7 | 73 | 100 | 7 |
| | | | Slew rate | | 1.00 | 0.31 | 1.70 | 2.00 |
| | | | Duration us | | 2.56 | 2.048 | 2.56 | 2.56 |
| | | | Waveform Portions | | Other | Other | Final | Expansion |
| 14 | 270 | 272 | Voltage level % | 13 | 7 | 73 | 100 | 13 |
| | | | Slew rate | | 1.00 | 0.71 | 2.00 | 1.00 |
| | | | Duration us | | 2.56 | 1.856 | 1.152 | 2.56 |
| | | | Waveform Portions | | Priming | Intermediate | Final | Expansion |
| 15 | 280 | 282 | Voltage level % | 13 | 13 | 73 | 100 | 13 |
| | | | Slew rate | | 1.00 | 0.71 | 2.00 | 2.00 |
| | | | Duration us | | 2.56 | 1.856 | 1.156 | 2.56 |
| | | | Waveform Portions | | Other | Intermediate | Final | Expansion |
| 16 | 290 | 292 | Voltage level % | 7 | 7 | 73 | 100 | 7 |
| | | | Slew rate | | 1.00 | 1.00 | 2.00 | 1.00 |
| | | | Duration us | | 2.56 | 2.048 | 2.56 | 2.56 |
| | | | Waveform Portions | | Other | Intermediate | Fiat | Expansion |

Figure 9:
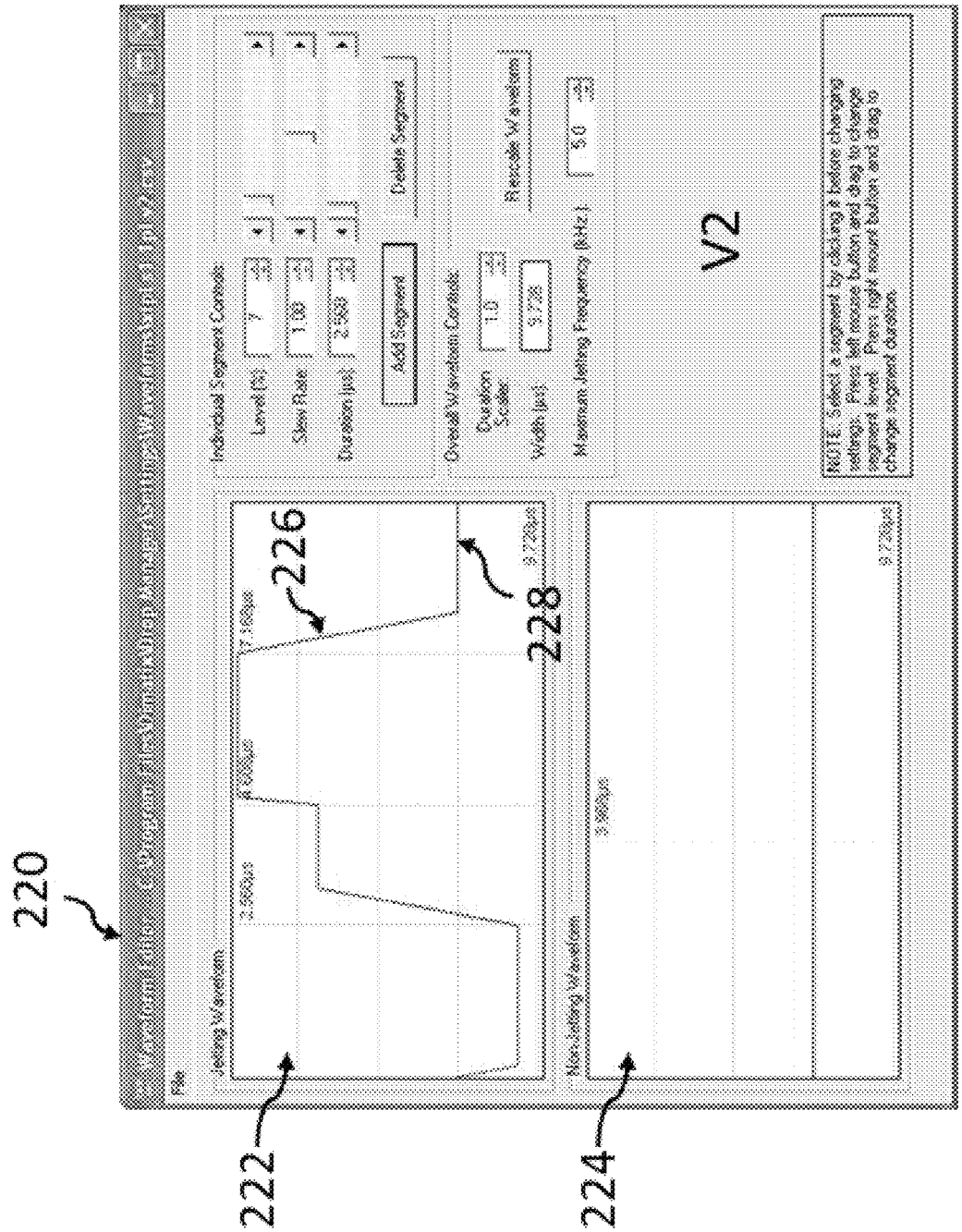

Jetting waveform 222 is explained in detail using FIG. 9 and Table 1. Jetting waveform 222 includes a priming waveform portion (portion 1), an intermediate contraction waveform portion (portion 2), a final contraction waveform portion (portion 3), and an expansion waveform portion (portion 4). At time zero of the jetting waveform, the applied voltage is at 27% of the maximum voltage $V_{max}$. Hereinbelow, when voltage is expressed in %, this means a percentage of the maximum voltage $V_{max}$. This applied voltage of 27% corresponds to the applied voltage during the duration of the quiescent waveform, which is applied before and after the jetting waveform 222. During the priming waveform portion (portion 1), the applied voltage decreases from a voltage level (27% for jetting waveform 222) of the quiescent waveform before it to an initial low voltage (7% for the jetting waveform 222) and is then held at the initial low voltage for a remainder of the duration of the priming waveform portion. The "initial low voltage" is the applied voltage at the start of the intermediate contraction waveform portion, as explained below. The initial low voltage does not exceed 30% of the maximum voltage $V_{max}$. Preferably, the initial low voltage does not exceed 10% of the maximum voltage $V_{max}$. In this example, a duration of the priming waveform portion is 2.56 μs. Preferably, the priming duration is in a range of 2.0 μs to 3.0 μs. In the example shown, the change (decrease) of the applied voltage from the voltage level of the previous quiescent waveform to the initial low voltage occurs with a slew rate of 1.0 $V_{max}$/μs. Preferably, the applied voltage decreases from the voltage level of the previous quiescent waveform to the initial low voltage with a slew rate of 0.5 $V_{max}$/μs or greater during the priming waveform portion.

During the intermediate contraction waveform portion (portion 2), the applied voltage increases from the initial low voltage (7% for the jetting waveform 222) to an intermediate voltage (73% for the jetting waveform 222) and is then held at the intermediate voltage for a remainder of the duration of the intermediate contraction waveform portion. The intermediate voltage is in a range of 63% to 83% of the maximum voltage $V_{max}$. Preferably, the intermediate voltage is in a range of 68% to 78% of the maximum voltage $V_{max}$. In this example, a duration of the intermediate contraction waveform portion is 2.048 μs. Preferably, the duration of the intermediate contraction waveform portion is in a range of 1.7 μs to 2.2 μs. In the example shown, the change (increase) of the applied voltage from the initial low voltage to the maximum voltage occurs with a slew rate of 1.0 $V_{max}$/μs. Preferably, the applied voltage increases from the intermediate voltage to the maximum voltage $V_{max}$ with a slew rate of 0.5 $V_{max}$/μs or greater during the final contraction waveform portion.

During the final contraction waveform portion (portion 3), the applied voltage increases from the intermediate voltage (73% for the jetting waveform 222) to the maximum voltage $V_{max}$ (100%) and is then held at the maximum voltage for a remainder of the duration of the final contraction waveform portion. In the example printer, the maximum voltage $V_{max}$ can be set to a voltage in a range of 16 V to 40 V. However, we found that better results can be obtained by selecting the maximum voltage $V_{max}$ to be in a range of 22 V to 27 V, or in a range of 24 V to 25 V. The drive signal examples shown in FIGS. 8, 9, 10, 11, 12, 13, 14, 15, and 16 were tested using the maximum voltage $V_{max}$ set in a range of 24 V to 25 V. Preferably, the maximum voltage $V_{max}$ is in a range of 22 V to 27 V. Preferably, the maximum voltage $V_{max}$ is in a range of 24 V to 25 V. In this example, a duration of the final contraction waveform portion is 2.56 μs. Preferably, the duration of the final contraction waveform portion is in a range of 1.0 μs to 2.7 μs. In the example shown, the change (increase) of the applied voltage from the intermediate voltage to the maximum voltage occurs with a slew rate of 2.0 $V_{max}$/μs. Preferably, the applied voltage increases from the intermediate voltage to the maximum voltage with a slew rate of 0.5 $V_{max}$/μs or greater during the final contraction waveform portion. Preferably, the applied voltage increases from the intermediate voltage to the maximum voltage with a slew rate of 1.5 $V_{max}$/μs or greater during the final contraction waveform portion.

During the expansion waveform portion (portion 4), the applied voltage decreases from the maximum voltage (100%) to a final low voltage (27% for the jetting waveform 222). The final low voltage does not exceed 30% of the maximum voltage $V_{max}$. Preferably, the final low voltage does not exceed 27% of the maximum voltage $V_{max}$. In the example shown, the change (decrease) of the applied voltage from the maximum voltage $V_{max}$ to the final low voltage occurs with a slew rate of 1.0 $V_{max}/\mu s$. Preferably, the applied voltage decreases from the maximum voltage to the final low voltage with a slew rate of 0.5 $V_{max}/\mu s$ or greater during the expansion waveform portion. In the example shown in FIG. 9, the expansion waveform portion includes a decreasing voltage segment 226, during which the applied voltage decreases from the maximum voltage $V_{max}$ to the final low voltage, and a constant voltage segment 228 during which the applied voltage is held at the final low voltage. In the example shown, a duration of the expansion waveform portion (including segments 226 and 228) is 2.56 μs (Table 1).

There is a quiescent waveform 182 after the jetting waveform 170 (FIG. 5). Preferably, the applied voltage during the quiescent waveform does not exceed 30% of the maximum voltage $V_{max}$. Preferably, a duration of the jetting waveform and a duration of the quiescent waveform sum to 0.2 millisecond or greater. In the example of the drive signal implementation 220 (FIG. 9), the applied voltage is held at the final low voltage (27%) during the quiescent waveform as well as during the constant voltage segment 228. Accordingly, the applied voltage at time zero is also 27%, corresponding to the final low voltage. If the jetting waveform includes a priming waveform portion, the applied voltage decreases from the time zero voltage to the initial low voltage. Accordingly, the initial low voltage is preferably less than or equal to the final low voltage.

Jetting waveform 272 (FIG. 14) is similar to jetting waveform 222 (FIG. 9) in that both waveforms include a priming waveform portion 172, an intermediate contraction waveform portion 174, a final contraction waveform portion 176, and an expansion waveform portion 178. Jetting waveforms 282 (FIG. 15) and 292 (FIG. 16) include an intermediate contraction waveform portion 174, a final contraction waveform portion 176, and an expansion waveform portion 178, but do not include a priming waveform portion 172. In the case of jetting waveforms 282 and 292, the initial low voltage (at the beginning of the intermediate contraction waveform portion 174) is unchanged from the voltage level during the quiescent waveform and from the final low voltage (at the end of the expansion waveform portion 178).

Jetting waveform 212 (FIG. 8) includes a priming waveform portion 172 and intermediate contraction waveform portion 174 but does not include a final contraction waveform portion. Instead, during the portion (portion 3) after the intermediate contraction waveform portion 174, the applied voltage decreases from the intermediate voltage (73%) to a low voltage (0%). The waveform shape of portion 3 is similar to an expansion portion. However, portion 3 is not an expansion portion because the applied voltage decreases from the intermediate voltage instead of from the maximum voltage. Additionally, during portion 4 after portion 3, the applied voltage increases from the low voltage (0%) to a higher voltage (27%).

Jetting waveforms 232 (FIG. 10), 242 (FIG. 11), and 252 (FIG. 12) each includes a respective priming waveform portion while jetting waveform 262 (FIG. 13) does not include any priming waveform portion. During portion 2 of each of these waveforms, the applied voltage increases from an "initial low voltage" to an "intermediate voltage". However, the applied voltage is not held at the "intermediate voltage". Accordingly, in each of these jetting waveforms, portion 2 does not have the characteristics of an intermediate contraction waveform portion. Subsequently during portion 3 of each of these waveforms, the applied voltage increases from the intermediate voltage to a maximum voltage $V_{max}$ and is then held at the maximum voltage. Accordingly, in each of these waveforms, portion 3 corresponds to a final contraction waveform portion. Subsequently during portion 4 of each of these waveforms, the applied voltage decreases from the maximum voltage $V_{max}$ to a final low voltage. Accordingly, in each of these waveforms, portion 4 corresponds to an expansion waveform portion.

Figure 6:
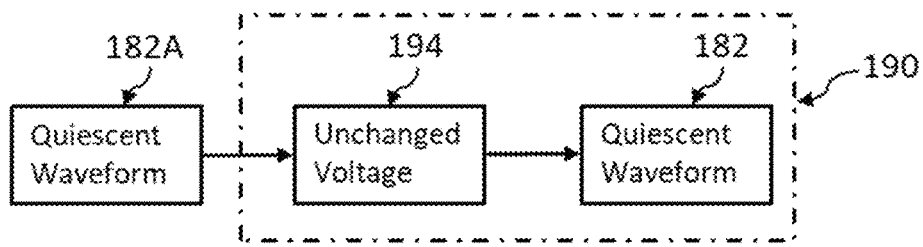
FIG. 6 is a schematic diagram illustrating components of a non-jetting drive signal.

FIG. 6 illustrates components of a non-jetting drive signal 190, including a non-jetting waveform 194 and a quiescent waveform 182 after the non-jetting waveform 194. The non-jetting drive signal 190 is applied after the quiescent waveform 182A of a previous pixel, such as a jetted pixel or a non-jetted pixel. In the case of FIG. 6, the non-jetting waveform 194 is configured such that the applied voltage is unchanged from the previous quiescent waveform 182A and the subsequent quiescent waveform 182. Non-jetting waveforms 214 (FIG. 8), 224 (FIG. 9), 234 (FIG. 10), 244 (FIG. 11), 254 (FIG. 12), 264 (FIG. 13), and 274 (FIG. 14) belong to this class of non-jetting waveforms 194. Voltage characteristics of these non-jetting waveforms are tabulated in Table 2.

TABLE 2

Characteristics of Non-Jetting Waveforms

| FIG. No. | Drive Signal | Non-Jetting Waveform | | Time Zero | Portion 1 | Portion 2 |
|---|---|---|---|---|---|---|
| 8 | 210 | 214 | Voltage level % | 27 | 27 | |
| 9 | 220 | 224 | Voltage level % | 27 | 27 | |
| 10 | 230 | 234 | Voltage level % | 27 | 27 | |
| 11 | 240 | 244 | Voltage level % | 27 | 27 | |
| 12 | 250 | 254 | Voltage level % | 27 | 27 | |
| 13 | 260 | 264 | Voltage level % | 7 | 7 | |
| 14 | 270 | 274 | Voltage level % | 13 | 13 | |
| 15 | 280 | 284 | Voltage level % | 13 | 27 | 13 |
| | | | Slew rate | | 1.00 | 1.00 |
| | | | Duration us | | 3.968 | 4.16 |
| 16 | 290 | 294 | Voltage level % | 7 | 20 | 7 |
| | | | Slew rate | | 1.00 | 1.00 |
| | | | Duration us | | 3.98 | 5.76 |

Figure 7:
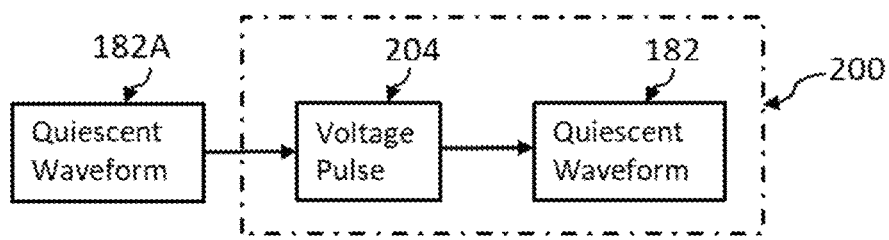
FIG. 7 is a schematic diagram illustrating components of another non-jetting drive signal.

FIG. 7 illustrates components of another non-jetting drive signal 200, including a non-jetting waveform 204 and a quiescent waveform 182 after the non-jetting waveform 204. In the case of FIG. 7, the non-jetting waveform 204 is configured such that the applied voltage includes a voltage pulse. Non-jetting waveforms 284 (FIG. 15) and 294 (FIG. 16) belong to this class of non-jetting waveforms 204. Voltage characteristics of these non-jetting waveforms are tabulated in Table 2. During non-jetting waveform 284, the applied voltage increases from 13%, which is the voltage level during the previous quiescent waveform 182A, to 27%, with a slew rate of 1.0 $V_{max}/\mu s$, wherein $V_{max}$ is the maximum voltage of the corresponding jetting waveform 282. In the example shown, a duration of the voltage pulse is 3.968 μs. Preferably, the voltage pulse during the non-jetting waveform is of 6 or less in duration. A suitable voltage pulse during the non-jetting waveform might agitate the composition in the pumping chamber, leading to more stable droplet formation during a subsequent jetting waveform.

Figure 18:
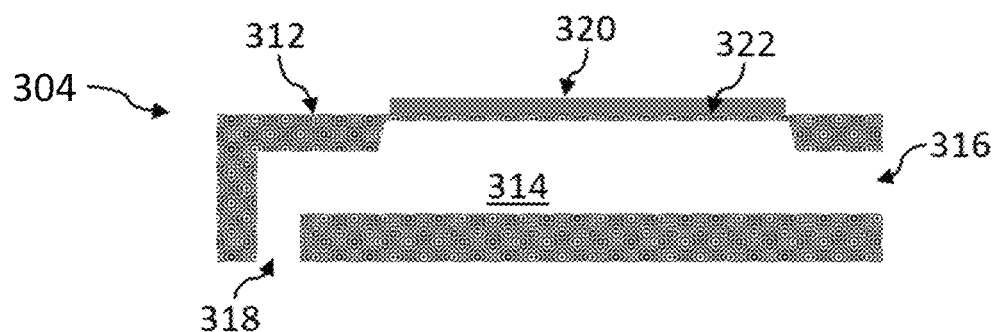
FIGS. 18, 19, 20, and 21 are schematic cross-sectional view of an ink-jet print head at respective states of actuation.
Figure 19:
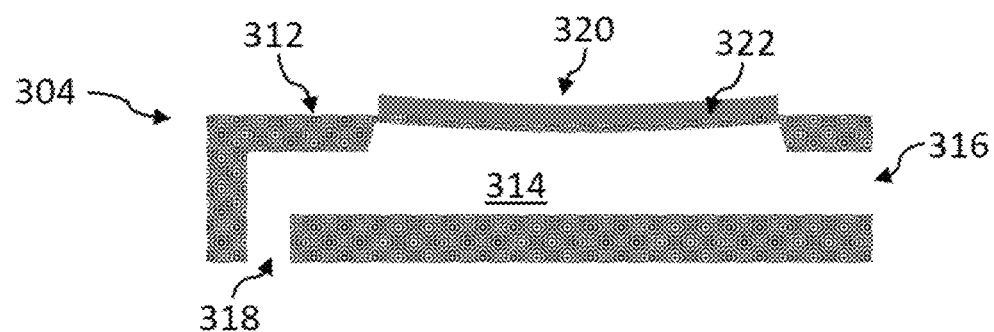
Figure 20:
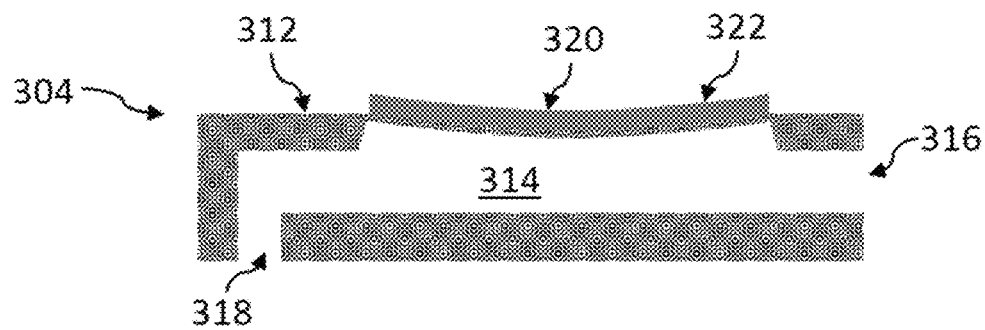
Figure 21:
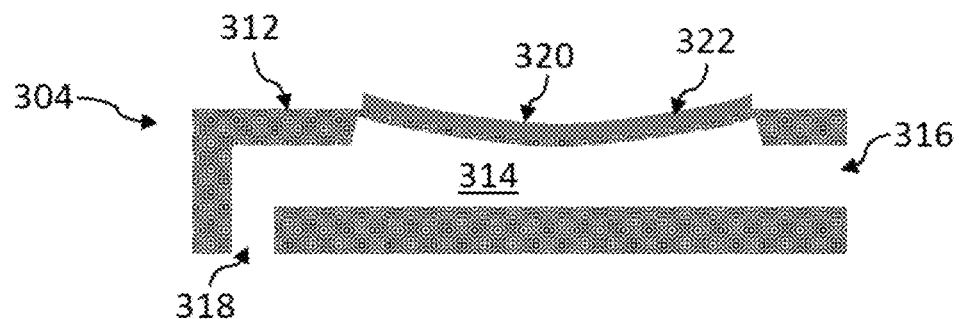

FIG. 18 is a schematic cross-sectional view of a print head 304 in one actuation state. The print head 304 includes a flow-path body 312 and a piezoelectric actuator 320. There is a pumping chamber 314 inside the flow-path body 312. The pumping chamber 314 has a fluid inlet 316 which is connected to a source of the fluid, such as a storage tank containing the fluid (not shown in FIG. 18). The fluid outlet is a nozzle opening 318 connected to the pumping chamber 314. In this case, the fluid is a silver nanoparticle composition. The piezoelectric actuator 320 is mechanically coupled to the pumping chamber 314 for expanding and contracting the pumping chamber 314. In the example shown, a portion 322 of the flow-path body is a mechanically deformable element and the piezoelectric actuator 320 is attached to or adhered to the deformable element 322. FIGS. 18, 19, 20, and 21 show respective states of actuation of the piezoelectric actuator 320 upon application of respective voltage signals to the piezoelectric actuator 320. FIGS. 18, 19, 20, and 21 show the first, second, third, and fourth actuation states, respectively. The pumping chamber in the first actuation state (FIG. 18) is expanded compared to the pumping chamber in the second, third, and fourth actuation states (FIGS. 19, 20, and 21). The pumping chamber in the fourth actuation state (FIG. 21) is contracted compared to the pumping chamber in the first, second, and third actuation states (FIGS. 18, 19, and 20). Accordingly, the piezoelectric actuator 320 is mechanically coupled to the pumping chamber 314 such that the pumping chamber is expanded and contracted.

FIGS. 18, 19, 20, and 21 show schematic cross-sectional views of the print head at respective states of actuation, with the degree of contraction of the pumping chamber increasing according to the sequence FIGS. 18, 19, 20, and 21. While we do not know the actual actuation states of the print head upon application of any of the drive signals (210, 220, 230, 240, 250, 260, 270, 280, 290), we believe that the first actuation state (schematically shown in FIG. 18) in which the piezoelectric membrane is nearly flat occurs at a low voltage near 0 V (for example, 7% or less of maximum voltage $V_{max}$). The deformation of the piezoelectric actuator inwards (towards the pumping chamber) increases with increasing applied voltage. A deformation of the piezoelectric actuator inwards corresponds to contraction of the pumping chamber. For example, the fourth actuation state (FIG. 21) might correspond to an applied voltage of 100% of a maximum voltage $V_{max}$.

During the intermediate contraction waveform portion, the pumping chamber is rapidly contracted from an expanded state (e.g., fully expanded state FIG. 18 or a slightly contracted state FIG. 19) to an intermediate contraction state (e.g., FIG. 20) and is held at the intermediate contraction state. During the final contraction waveform portion, the pumping chamber is rapidly contracted from the intermediate contraction state (e.g., FIG. 20) to a final contraction state (e.g., FIG. 21) and is held at the final contraction state. During the final contraction waveform portion, a droplet of the silver nanoparticle composition is ejected (dispensed) through the nozzle opening. We believe that the intermediate contraction waveform portion contributes to stabilizing the droplet formation. During the expansion waveform portion, the pumping chamber is rapidly expanded from the final contraction state (e.g., FIG. 21) to an expanded state (e.g., fully expanded state FIG. 18 or the slightly contracted state FIG. 19). During the expansion waveform portion, silver nanoparticle composition is refilled in the pumping chamber 314. During the expansion waveform portion, silver nanoparticle composition flows from a storage chamber via fluid inlet 316 into the pumping chamber 314. During the priming waveform portion, the pumping chamber is rapidly expanded from a slightly contracted state (e.g., FIG. 19) to a fully expanded state (e.g., FIG. 18). During the priming waveform portion, it is possible that silver nanoparticle composition flows from a storage chamber via fluid inlet 316 into the pumping chamber 314.

Figure 8:
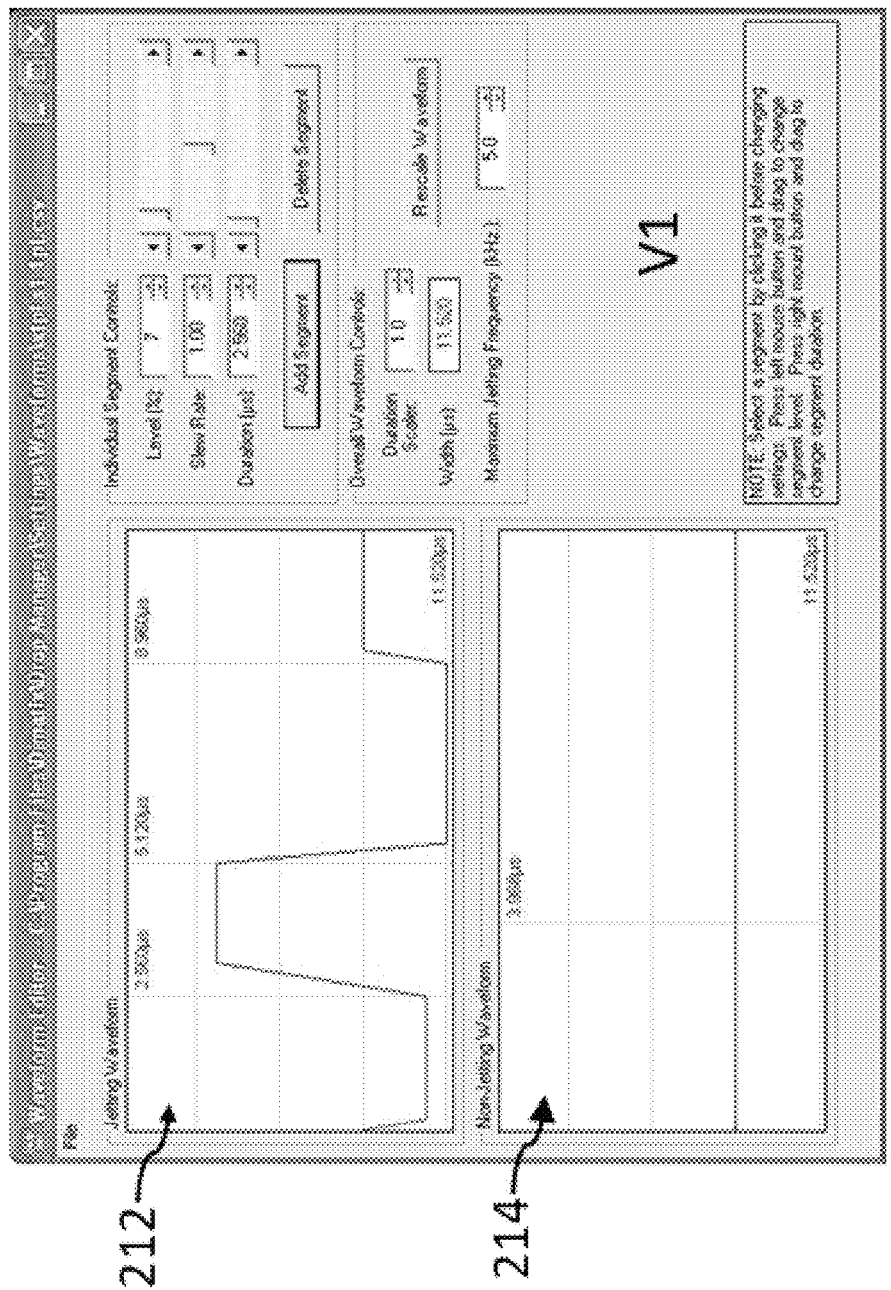
FIGS. 8, 9, 10, 11, 12, 13, 14, 15, and 16 are graphical plots of respective implementations of drive signals.

Printing tests were conducted using the Example 1 and Example 2 silver nanoparticle compositions. Printing results were evaluated for each of the drive signals in FIGS. 8, 9, 10, 11, 12, 13, 14, 15, and 16. The printing results are tabulated in Table 3. Printing results for the FIG. 8 example was bad. In the example of FIG. 8 (jetting waveform 212), some of the nozzles did not fire (dispense) and the droplets were too small and slow. This jetting waveform 212 does not include a final contraction waveform portion. The "maximum voltage" (73% of $V_{max}$) is reached during the intermediate contraction waveform portion. It is thought that the maximum voltage is related to the kinetic energy imparted to the droplet. Accordingly, when the applied voltage is too low, the droplet speed might be too low. Droplets that are too slow tend to be more unstable, and consequently the flight directions of droplets might not be reproducible. Additionally, it is thought a duration of the contraction waveform portions (sum of the duration of the intermediate contraction waveform portion and the duration of the final contraction waveform portion) is related to the size of the droplets. Accordingly, when the duration is too short, the droplet size might be too small. It is preferable that droplets be of sufficient size. When the droplets are of sufficient size, there is less likelihood of residual ink (silver nanoparticle composition) remaining at the nozzle opening (nozzle contamination) which would disturb the flow of the composition through the nozzle opening.

TABLE 3

Printing Performance

| FIG. No. | Drive signal No. | Jetting waveform | Non-jetting waveform | Overall printing performance | Bad aspects of performance | Good aspects of performance |
| --- | --- | --- | --- | --- | --- | --- |
| 8 | 210 | 212 | 214 | Bad | Droplets are too small; Slow droplets; Some nozzles do not fire | None |
| 9 | 220 | 222 | 224 | Good | None | Short tails |
| 10 | 230 | 232 | 234 | Fair | Slow droplets | Short tails; Droplets are sufficiently big |

TABLE 3-continued

Printing Performance

| FIG. No. | Drive signal No. | Jetting waveform | Non-jetting waveform | Overall printing performance | Bad aspects of performance | Good aspects of performance |
| --- | --- | --- | --- | --- | --- | --- |
| 11 | 240 | 242 | 244 | Bad | Medium tails | Fast droplets; Stable droplets |
| 12 | 250 | 252 | 254 | Bad | Long tails | Fast droplets |
| 13 | 260 | 262 | 264 | Fair | None | Round droplets; Short tails |
| 14 | 270 | 272 | 274 | Good | None | Round droplets; Short tails |
| 15 | 280 | 282 | 284 | Fair | Droplets are too small; Flight directions of droplets are not reproducible | Stable droplets; Short tails |
| 16 | 290 | 292 | 294 | Good | None | Short tails; Good stability and reproducibility |

Figure 11:
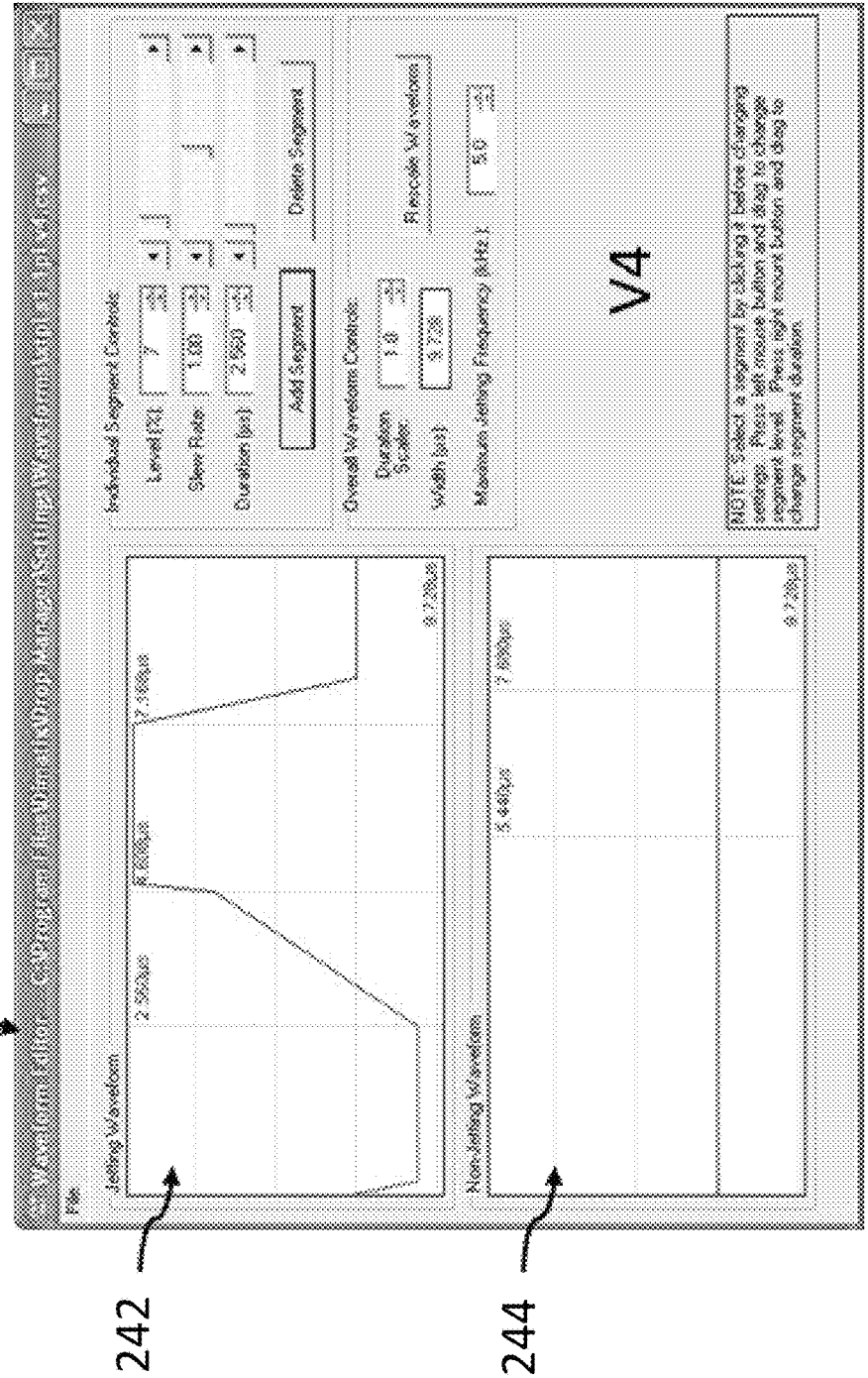
Figure 12:
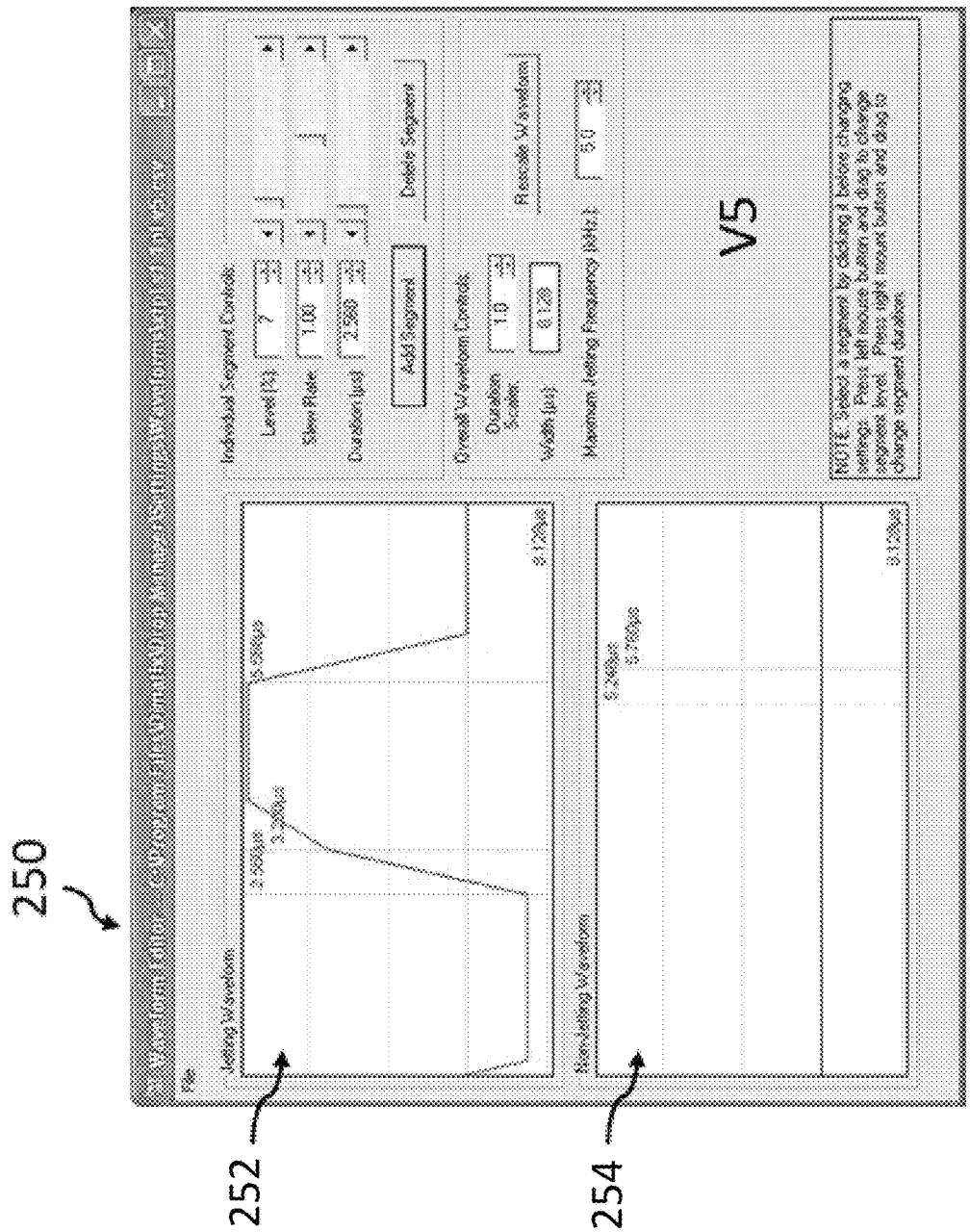

Printing results for the examples of FIGS. 11 and 12 were bad. In the example of FIG. 11 (jetting waveform 242), the droplets were fast and stable and in the example of FIG. 12 (jetting waveform 252), the droplets were fast. However, the droplets had medium tails (jetting waveform 242, FIG. 11) and long tails (jetting waveform 252, FIG. 12), respectively. There may be a correlation between faster droplets and larger tails. A tail is a smaller portion of a droplet that follows a main portion of the droplet. If a tail is sufficiently small, it is more likely to be "absorbed" into the main droplet portion during the trajectory from the nozzle opening to the substrate. A tail that is not absorbed into the main droplet portion can separate and create a pattern of "satellite" droplets on the substrate. Such satellite droplets degrade print quality. Accordingly, it is preferable to make the tails sufficiently small. In these jetting waveforms 242, 252, there is no intermediate contraction waveform portion since the applied voltage is not held at an intermediate voltage.

Figure 10:
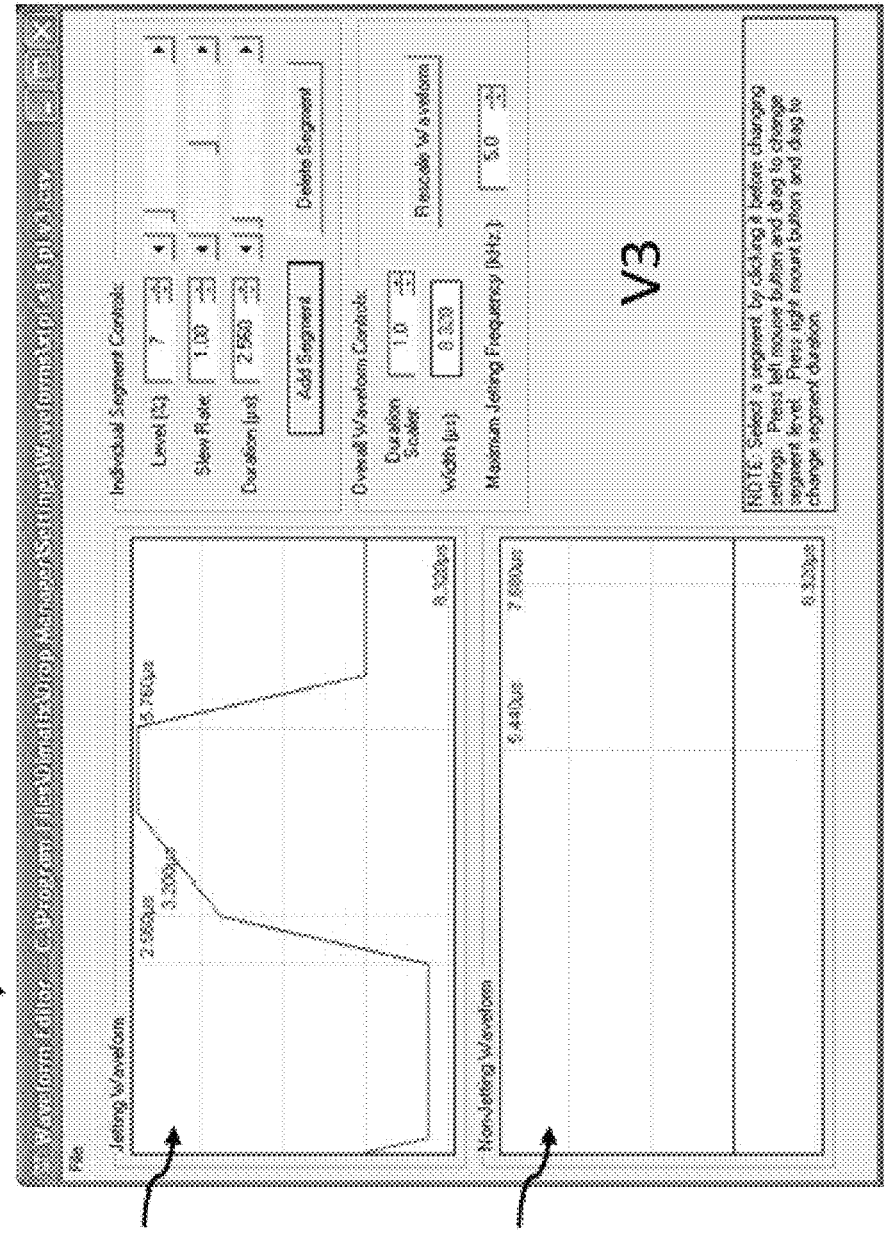
Figure 13:
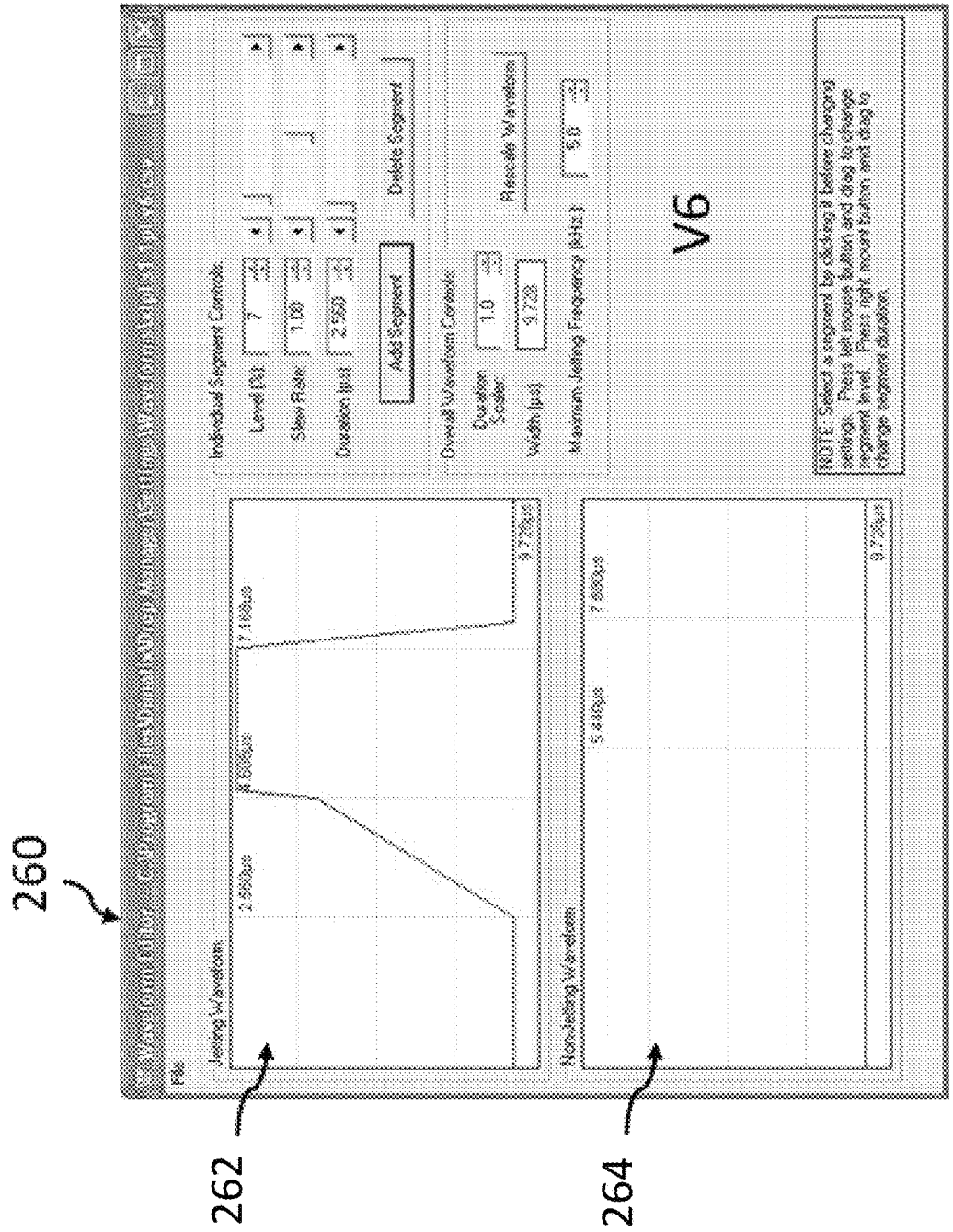

Printing results for the examples of FIGS. 10 and 13 were fair. In the examples, the respective jetting waveforms (232 for FIGS. 10 and 262 for FIG. 13) do not include an intermediate contraction waveform portion since the applied voltage is not held at an intermediate voltage. In the example of FIG. 10 (jetting waveform 232), the droplets had short tails and were sufficiently large and in the example of FIG. 13 (jetting waveform 262), the droplets were round and had short tails. However, in the FIG. 10 example, it was observed that the droplets were slow (jetting waveform 232).

Figure 14:
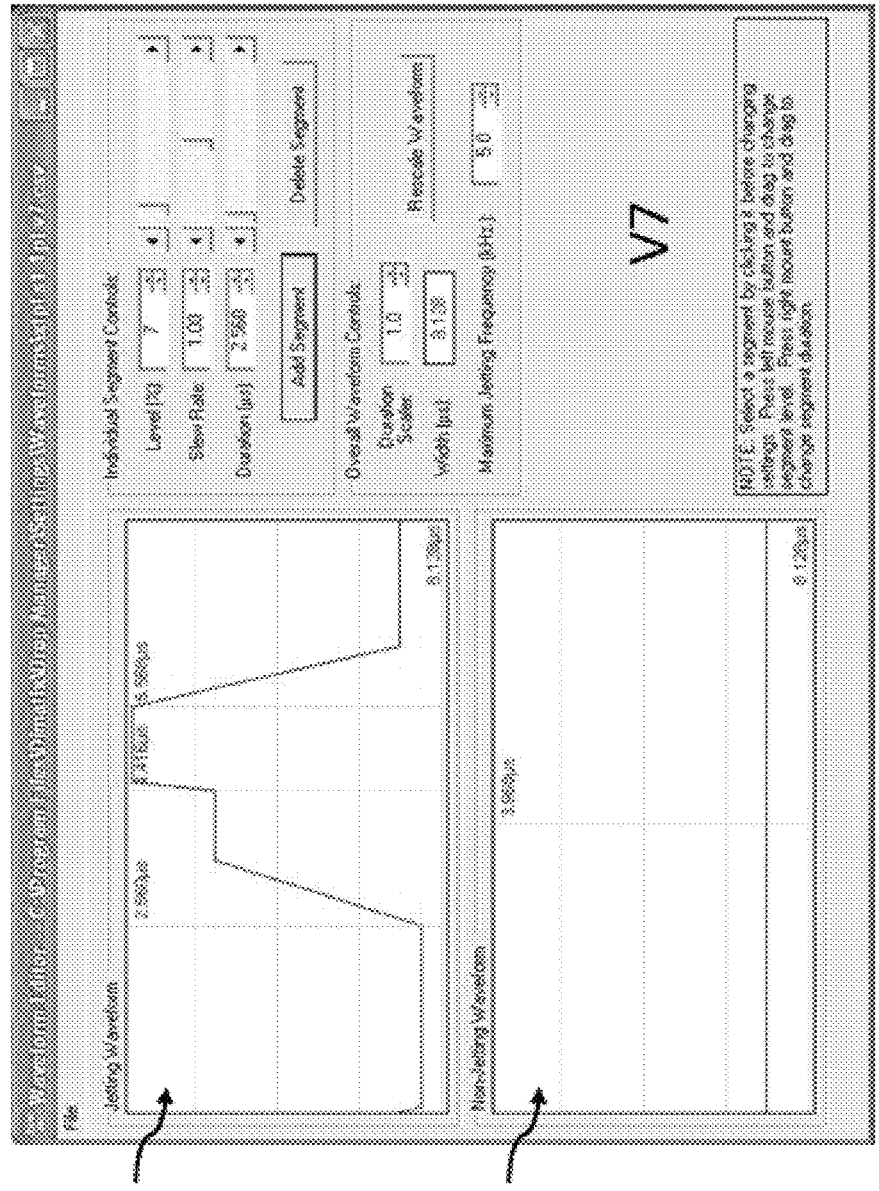
Figure 15:
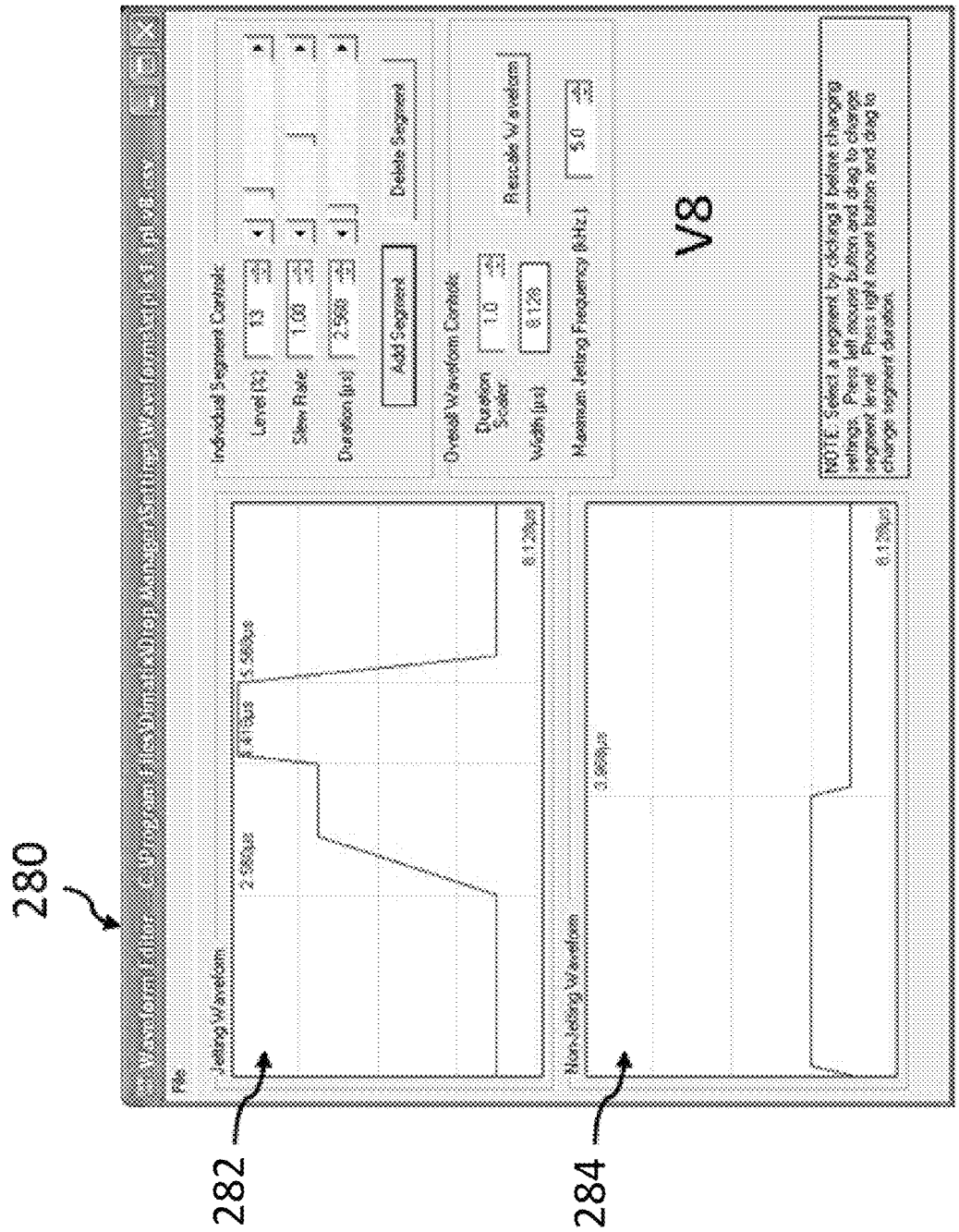
Figure 16:
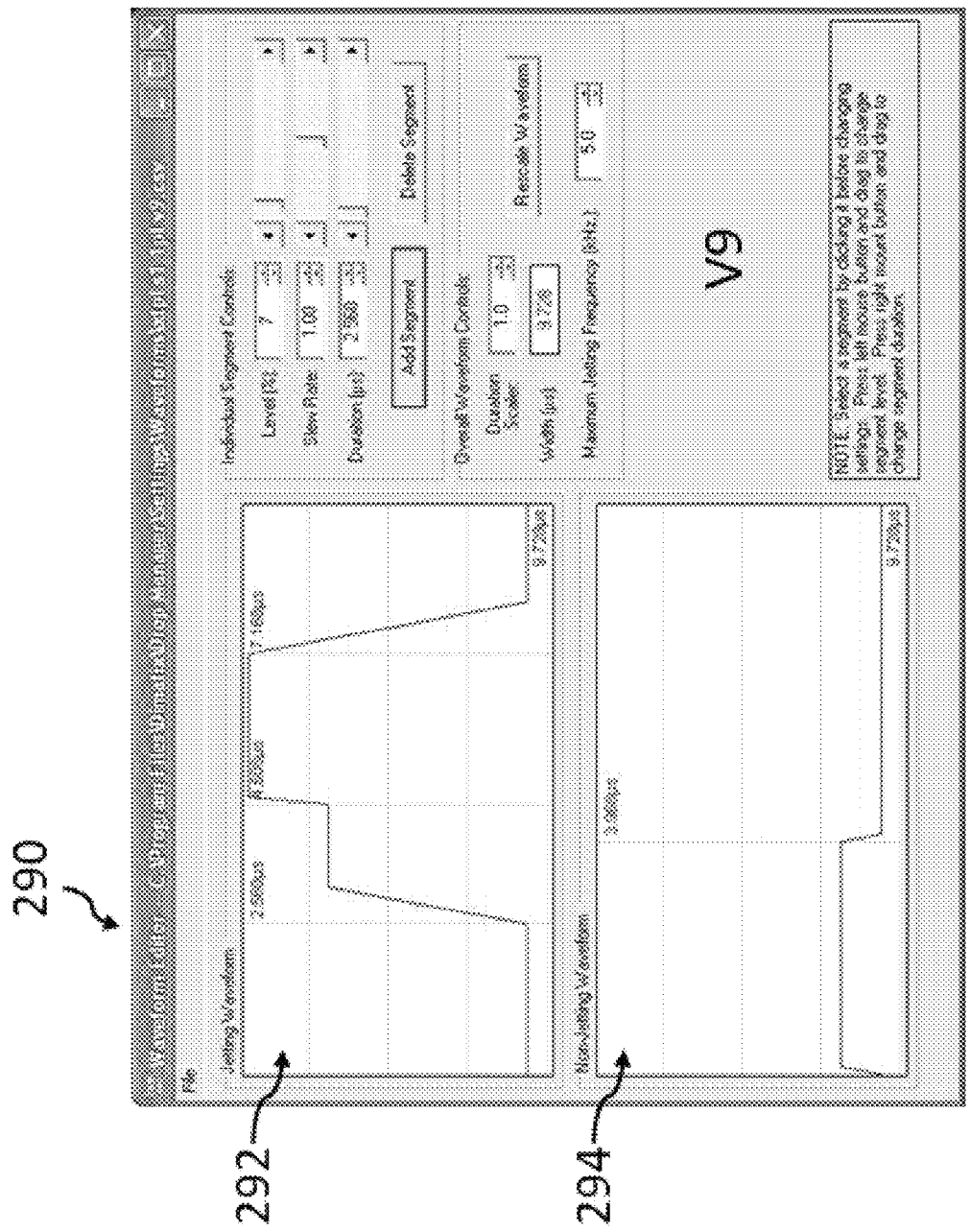

In the examples of FIGS. 9, 14, 15, and 16, the respective jetting waveforms (222, 272, 282, and 292) include an intermediate contraction waveform portion and a final contraction waveform portion. Printing results for the examples of FIGS. 9, 14, and 16 were good and printing results for the example of FIG. 15 were fair. In all of these example (jetting waveforms 222, 272, 282, and 292), the droplets had short tails. In the example of FIG. 14 (jetting waveform 272), the droplets were round. In the example of FIG. 15 (jetting waveform 282), the droplets were stable. In the example of FIG. 16 (jetting waveform 292), the droplets had good stability and reproducibility. The example of FIG. 15 was deemed to be fair instead of good because the droplets were too small and the flight directions of the droplets were not reproducible. The jetting waveforms 272 (FIG. 14) and 282 (FIG. 15) included intermediate contraction waveform portions and final contraction waveform portions of similar voltage levels and durations. Primarily, these jetting waveforms differed in that jetting waveform 272 includes a priming waveform portion before the intermediate contraction waveform portion while the jetting waveform 282 does not include a priming waveform portion. Accordingly, it is possible that the inclusion of a priming waveform portion contributes to better printing performance.

In the examples of FIGS. 15 and 16, the respective non-jetting waveforms (284, 294) include voltage pulses. We believe that a suitable voltage pulse during the non-jetting waveform might agitate the composition in the pumping chamber, leading to more stable droplet formation during a subsequent jetting waveform. The non-jetting waveform 284 in the FIG. 15 example includes a voltage pulse while the non-jetting waveform 274 in the FIG. 14 example does not include a voltage pulse.

EXAMPLES

Example 1: Silver Nanoparticles Based Ink Composition (Solids Content: 34-36 wt %) in 2-(2-Butoxyethoxy)Ethanol Reagents:
$AgNO_3$ —12.5 g
PVP (K30 grade)—100.2 g
Ethylene glycol—560 ml
Acetone—1520 ml
Ethanol 96%—300 ml
Triethylene glycol—1.326 ml
2-(2-butoxyethoxy)ethanol—25 ml 1) Synthesis Two synthesis reactions were done in parallel. For each synthesis reaction: $AgNO_3$ (12.5 g) was dissolved in 50 ml of Ethylene Glycol at room temperature. In a three-necked flask, PVP (100.2 g) was dissolved in 250 ml of Ethylene Glycol, under reflux, while heating at 140° C. $AgNO_3$ solution was poured in a quick movement (via funnel) into hot PVP dissolved in Ethylene Glycol. Mixtures were heated at 140° C. for 60 min under vigorous stirring. Finally, cooled in a cold water bath until room temperature was reached.

2) Purification

Mixture from each synthesis was poured into a 2.5 liter beaker. 100 ml of Ethylene Glycol was added to the three-necked reaction flask, sonicated for 1 min under stirring and pooled with the previously mentioned fraction. 1440 ml of Acetone and 160 ml of Ethylene Glycol were mixed in a 2 liter beaker and poured into the beaker containing the Ag NPs suspension, under stirring. Another 40 ml of acetone was then added, then another 40 ml of acetone was added, and then a few milliliters of ethylene glycol to suspension color change from dark green to brown. The contents of the beaker were poured equally into six 500 ml centrifuge bottles and were centrifuged for 15 min @ 4000×g. Clear orange supernatants were discarded. Silver pellets were re-dispersed in 40 ml of ethanol (per bottle) under sonication and shaking (10 min). The solutions were poured into two bottles, followed by centrifugation for 45 min @ 12000×g. The pellets were individually redispersed in 50 mL EtOH, under sonication and shaking (10 min).

3) Formulation

Obtained dispersions in ethanol were transferred into 60 ml syringe and filtered through 1.0 um PA filter directly into round-bottom flask (250 ml) made from PFA. 18.00 mL of 2-(2-butoxyethoxy)ethanol, 99+% was added. Flask was placed on a rotary evaporator at 44° C., 80 mbar for 10 min, 30 mbar for 25 min and dispersion was transferred into 100 ml flask and evaporated at 35 mbar, when reached, condition was kept for 5 min. Obtained ink concentrate solid loading was determined by gravimetric analysis—it should be around 45 wt %. Ink concentrate was diluted with an adequate amount of 2-(2-butoxyethoxy)ethanol to obtain ink with solid content in the range of 34-36 wt % and viscosity from 26-30 cP @ 25° C. Finally, ink was transferred into a syringe, filtered through a 1 um PA filter into a clean PP container. Pure silver content in ink is estimated to be in a range of 32-34 wt % range, determined by TGA or AAS method.

Example 2: Silver Nanoparticles Based Ink Composition (Solids Content: 39 wt %-41 Wt %) in 2-(2-Butoxyethoxy)Ethanol Reagents:
AgNO$_3$ —12.5 g
PVP (K30 grade)—100.2 g
Ethylene glycol—560 ml
Acetone—1520 ml
Ethanol 96%—300 ml
Triethylene glycol—1.326 ml
2-(2-butoxyethoxy)ethanol—25 ml 1) Synthesis Two synthesis reactions were done in parallel. For each synthesis reaction: AgNO$_3$ (12.5 g) was dissolved in 50 ml of Ethylene Glycol at room temperature. In a three-necked flask, PVP (100.2 g) was dissolved in 250 ml of Ethylene Glycol, under reflux, while heating at 140° C. AgNO$_3$ solution was poured in a quick movement (via funnel) into hot PVP dissolved in Ethylene Glycol. Mixtures were heated at 140° C. for 60 min under vigorous stirring. Finally, cooled in a cold water bath until room temperature was reached.

2) Purification

Mixture from each synthesis was poured into a 2.5 liter beaker. 100 ml of Ethylene Glycol was added to the three-necked reaction flask, sonicated for 1 min under stirring and pooled with the previously mentioned fraction. 1440 ml of Acetone and 160 ml of Ethylene Glycol were mixed in a 2 liter beaker and poured into the beaker containing the Ag NPs suspension, under stirring. Another 40 ml of acetone was then added, then another 40 ml of acetone was added, and then a few milliliters of ethylene glycol to suspension color change from dark green to brown. The contents of the beaker were poured equally into six 500 ml centrifuge bottles and were centrifuged for 15 min @ 4000×g. Clear orange supernatants were discarded. Silver pellets were re-dispersed in 40 ml of ethanol (per bottle) under sonication and shaking (10 min). The solutions were poured into two bottles, followed by centrifugation for 45 min @ 12000×g. The pellets were individually redispersed in 50 mL EtOH, under sonication and shaking (10 min).

3) Formulation

Obtained dispersions in ethanol were transferred into 60 ml syringe and filtered through 1.0 um PA filter directly into round-bottom flask (250 ml) made from PFA. 18.00 mL of 2-(2-butoxyethoxy)ethanol, 99+% was added. Flask was placed on a rotary evaporator at 44° C., 80 mbar for 10 min, 30 mbar for 25 min and dispersion was transferred into 100 ml flask and evaporated at 35 mbar, when reached, condition was kept for 5 min. Obtained ink concentrate solid loading was determined by gravimetric analysis—it should be around 45 wt %. Ink concentrate was diluted with an adequate amount of 2-(2-butoxyethoxy)ethanol to obtain ink with solid content in the range of 39-41 wt % and viscosity from 50-60 cP @ 25° C. Finally, ink was transferred into a syringe, filtered through a 1 μm PA filter into a clean PP container. Pure silver content in ink is estimated to be in a range of 37-39 wt %, determined by TGA or AAS method.

What is claimed is:

1. A method of forming a feature by dispensing a metallic nanoparticle composition from an ink-jet print head, comprising the steps of:
    configuring the ink-jet print head comprising a pumping chamber connected to a source of the metallic nanoparticle composition, a piezoelectric actuator mechanically coupled to the pumping chamber for expanding and contracting the pumping chamber, and a nozzle opening connected to the pumping chamber;
    at a jetted pixel, applying a jetting drive signal to the piezoelectric actuator to dispense droplets of the metallic nanoparticle composition through the nozzle opening, the droplets ranging in volume between 0.5 picoliter and 2.0 picoliter, the jetting drive signal comprising a jetting waveform;
    wherein the jetting waveform comprises an intermediate contraction waveform portion, a final contraction waveform portion after the intermediate contraction waveform portion, and an expansion waveform portion after the final contraction waveform portion;
    during the intermediate contraction waveform portion, an applied voltage of the jetting drive signal increases from an initial low voltage to an intermediate voltage and is then held at the intermediate voltage;
    during the final contraction waveform portion, the applied voltage increases from the intermediate voltage to a maximum voltage $V_{max}$ and is then held at the maximum voltage;
    during the expansion waveform portion, the applied voltage decreases from the maximum voltage $V_{max}$ to a final low voltage;
    the intermediate voltage is in a range of 63% to 83% of the maximum voltage $V_{max}$; and
    the initial low voltage and the final low voltage do not exceed 30% of the maximum voltage $V_{max}$,
    wherein the jetting drive signal additionally comprises a quiescent waveform after the jetting waveform, the applied voltage during the quiescent waveform does not exceed 30% of the maximum voltage, and a duration of the jetting waveform and a duration of the quiescent waveform sum to 0.2 millisecond or greater;

the jetting waveform additionally comprises a priming waveform portion before the intermediate contraction waveform portion;

during the priming waveform portion, the applied voltage decreases from a voltage level of the other quiescent waveform to the initial low voltage and is then held at the initial low voltage; and the initial low voltage does not exceed 10% of the maximum voltage.

2. The method of claim 1, wherein the applied voltage is held at the final low voltage during the quiescent waveform.

3. The method of claim 1, wherein a duration of the priming waveform portion is in a range of 2.0 microseconds to 3.0 microseconds.

4. The method of claim 1, wherein during the priming waveform portion the applied voltage decreases from the voltage level of the other quiescent waveform to the initial low voltage with a slew rate of 0.5 $V_{max}$/ms or greater.

5. The method of claim 1, wherein the intermediate voltage is in a range of 68% to 78% of the maximum voltage $V_{max}$.

6. The method of claim 1, wherein a duration of the intermediate contraction waveform portion is in a range of 1.7 microseconds to 2.2 microseconds.

7. The method of claim 1, wherein during the intermediate contraction waveform portion the applied voltage increases from the initial low voltage to the intermediate voltage with a slew rate of 0.5 $V_{max}$/ms or greater.

8. The method of claim 1, wherein the maximum voltage $V_{max}$ is in a range of 22 V to 27 V.

9. The method of claim 8, wherein the maximum voltage $V_{max}$ is in a range of 24 V to 25 V.

10. The method of claim 1, wherein a duration of the final contraction waveform portion is in a range of 1.0 microseconds to 2.7 microseconds.

11. The method of claim 1, wherein during the final contraction waveform portion the applied voltage increases from the intermediate voltage to the maximum voltage $V_{max}$ with a slew rate of 0.5 $V_{max}$/ms or greater.

12. The method of claim 11, wherein the slew rate is 1.5 $V_{max}$/ms or greater.

13. The method of claim 1, wherein the final low voltage does not exceed 27% of the maximum voltage $V_{max}$.

14. The method of claim 1, wherein during the expansion waveform portion the applied voltage decreases from the maximum voltage $V_{max}$ to the final low voltage with a slew rate of 0.5 $V_{max}$/ms or greater.

15. The method of claim 1, wherein the initial low voltage is less than or equal to the final low voltage.

16. The method of claim 1, wherein the initial low voltage does not exceed 10% of the maximum voltage $V_{max}$.

17. The method of claim 1, additionally comprising a steps of:

at a non-jetted pixel, applying a non-jetting drive signal to the piezoelectric actuator, the non-jetting drive signal comprising a non-jetting waveform and the quiescent waveform.

18. The method of claim 17, wherein non jetting waveform comprises a voltage pulse of a duration of 6 microseconds or less.

19. The method of claim 1, wherein the metallic nanoparticle composition comprises silver nanoparticles and a glycol ether solvent having a boiling point in a range of 200° C. to 240° C., a viscosity at 25° C. in a range of 4 cP and 8 cP, and a vapor pressure not exceeding 0.1 mm Hg at 25° C., a concentration of silver in the metallic nanoparticle composition being in a range of 20 wt % to 40 wt %, and polyvinylpyrrolidone being present on the silver nanoparticle surfaces.

20. The method of claim 19, wherein the glycol ether solvent is 2-(2-butoxyethoxy)ethanol.

21. The method of claim 19, wherein the silver nanoparticles have an average particle size in a range of 20 nm to 80 nm.

22. The method of claim 21, wherein the silver nanoparticles have an average particle size in a range of 35 nm to 50 nm.

23. The method of claim 19, wherein the silver nanoparticles are approximately spherical.

24. The method of claim 19, wherein a viscosity of the metallic nanoparticle composition is in a range of 26 cP to 60 cP, measured at 25° C. under a shear rate of 100 $s^{-1}$.

25. The method of claim 19, wherein a surface tension of the metallic nanoparticle composition is in a range of 28 mN/m to 32 mN/m, measured at 25° C.

26. The method of claim 19, wherein a concentration, in aggregate, of water, methanol, ethanol, 1-propanol, and 2-propanol, in the metallic nanoparticle composition does not exceed 10.0 wt %.

27. The method of claim 19, wherein a concentration, in aggregate, of solvents other than the glycol ether solvent in the metallic nanoparticle composition does not exceed 10.0 wt %.

28. The method of claim 19, wherein the concentration of silver in the metallic nanoparticle composition is in a range of 32 wt % to 39 wt %.

29. The method of claim 1, wherein the ink used in the ink-jet printing is a metallic nanoparticle composition comprising:

silver nanoparticles; and a glycol ether solvent having a boiling point in a range of 200° C. to 240° C., a viscosity in a range of 4 cP and 8 cP at 25° C., and a vapor pressure not exceeding 0.1 mm Hg at 25° C.;

wherein a concentration of silver in the metallic nanoparticle composition is in a range of 20 wt % to 40 wt %; and polyvinylpyrrolidone is present on the silver nanoparticle surfaces.

30. The method of claim 29, wherein the glycol ether solvent is 2-(2-butoxyethoxy)ethanol.

31. The method of claim 29, wherein the silver nanoparticles have an average particle size in a range of 20 nm to 80 nm.

32. The method of claim 31, wherein the silver nanoparticles have an average particle size in a range of 35 nm to 50 nm.

33. The method of claim 29, wherein the silver nanoparticles are approximately spherical.

34. The method of claim 29, wherein a viscosity of the metallic nanoparticle composition is in a range of 26 cP to 60 cP, measured at 25° C. under a shear rate of 100 $s^{-1}$.

35. The method of claim 29, wherein a surface tension of the metallic nanoparticle composition is in a range of 28 mN/m to 32 mN/m, measured at 25° C.

36. The method of claim 29, wherein a concentration, in aggregate, of water, methanol, ethanol, 1-propanol, and 2-propanol, in the metallic nanoparticle composition does not exceed 10.0 wt %.

37. The method of claim 29, wherein a concentration, in aggregate, of solvents other than the glycol ether solvent in the metallic nanoparticle composition does not exceed 10.0 wt %.

38. The method of claim 29, wherein the concentration of silver in the metallic nanoparticle composition is in a range of 32 wt % to 39 wt %.

\* \* \* \* \*

UNITED STATES PATENT AND TRADEMARK OFFICE
CERTIFICATE OF CORRECTION

| | | |
|---|---|---|
| PATENT NO. | : 11,987,049 B2 | Page 1 of 1 |
| APPLICATION NO. | : 18/247536 | |
| DATED | : May 21, 2024 | |
| INVENTOR(S) | : Mateusz Lysien et al. | |

It is certified that error appears in the above-identified patent and that said Letters Patent is hereby corrected as shown below:

In the Specification

Column 3, Lines 7-9, replace "of" with "to"

Column 3, Lines 9-11, replace "are" with "is" so that the sentence recites "In order to decrease the likelihood of nanoparticle aggregation, a nozzle (nozzle opening) that generates droplets that are larger than desired is typically used."

Column 4, Lines 32-34, remove "of a range"

Column 4, Lines 34-37, remove "of a range"

Column 6 Line 49-Column 7, Line 28, replace "Duration us" with "Duration µs" in all six locations in Column 4 of Table 1

Column 10, Lines 26-53, replace "Duration us" with "Duration µs" in both locations in Column 4 of Table 2

In the Claims

Column 17, Line 18, replace "ms" with "µs"

Column 17, Line 28-29, replace "ms" with "µs"

Column 17, Line 40, replace "ms" with "µs"

Column 17, Line 41-42, replace "ms" with "µs"

Column 17, Line 47-48, replace "ms" with "µs"

Signed and Sealed this
Sixth Day of August, 2024

*Katherine Kelly Vidal*

Katherine Kelly Vidal
*Director of the United States Patent and Trademark Office*